United States Patent
Yang et al.

(10) Patent No.: US 10,453,250 B2
(45) Date of Patent: Oct. 22, 2019

(54) GRAPHICS PROCESSING METHOD AND SYSTEM FOR PROCESSING SUB-PRIMITIVES

(71) Applicant: Imagination Technologies Limited, Kings Langley (GB)

(72) Inventors: Xile Yang, Rickmansworth (GB); John W. Howson, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 27 days.

(21) Appl. No.: 15/920,663

(22) Filed: Mar. 14, 2018

(65) Prior Publication Data

US 2018/0276876 A1    Sep. 27, 2018

(30) Foreign Application Priority Data

Mar. 14, 2017   (GB) .................................. 1704068.4

(51) Int. Cl.
| | |
|---|---|
| *G06T 15/30* | (2011.01) |
| *G06T 15/00* | (2011.01) |
| *G06T 1/60* | (2006.01) |
| *G06T 1/20* | (2006.01) |
| *G06T 15/04* | (2011.01) |
| *G06T 15/40* | (2011.01) |
| *G06T 15/80* | (2011.01) |

(52) U.S. Cl.
CPC ................ *G06T 15/30* (2013.01); *G06T 1/20* (2013.01); *G06T 1/60* (2013.01); *G06T 15/005* (2013.01); *G06T 15/04* (2013.01); *G06T 15/40* (2013.01); *G06T 15/80* (2013.01)

(58) Field of Classification Search
CPC .. G06T 15/30; G06T 1/20; G06T 1/60; G06T 15/005; G06T 15/04; G06T 15/40; G06T 15/80

See application file for complete search history.

(56) References Cited

U.S. PATENT DOCUMENTS

| | | | |
|---|---|---|---|
| 10,210,649 B2* | 2/2019 | Sansottera | ................ G06T 1/20 |
| 10,249,085 B2* | 4/2019 | Howson | ................... G06T 1/20 |

(Continued)

FOREIGN PATENT DOCUMENTS

GB          2458488 A       9/2009

*Primary Examiner* — Yu Chen
(74) *Attorney, Agent, or Firm* — Vorys, Sater, Seymour and Pease LLP; Vincent M DeLuca

(57) ABSTRACT

A graphics processing system configured to use a rendering space which is subdivided into a plurality of tiles, includes geometry processing logic having geometry transform and sub-primitive logic configured to receive graphics data of input graphics data items, and to determine transformed positions within the rendering space of one or more sub-primitives derived from the input graphics data items using a plurality of shader stages; and a tiling unit configured to generate control stream data including sub-primitive indications to indicate which of the sub-primitives are to be used for rendering each tile. The geometry processing logic is configured to write to a memory, for each instance of a pre-determined shader stage, shader stage output data comprising data output from each instance of the pre-determined shader stage used to process the received graphics data.

20 Claims, 11 Drawing Sheets

(56) References Cited

U.S. PATENT DOCUMENTS

| | | | |
|---|---|---|---|
| 2014/0063016 A1* | 3/2014 | Howson | G06T 15/80 345/426 |
| 2015/0379672 A1 | 12/2015 | Wang | |
| 2017/0069126 A1 | 3/2017 | Sansottera et al. | |
| 2017/0069132 A1 | 3/2017 | Howson et al. | |
| 2018/0308285 A1* | 10/2018 | Doyle | G06T 17/20 |

* cited by examiner

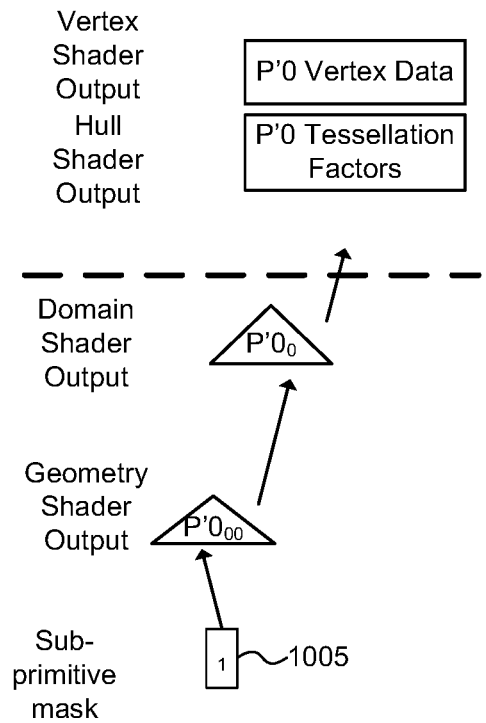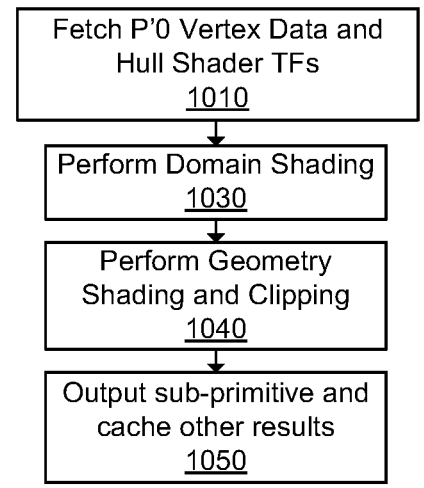
FIG. 10(A)       FIG. 10(B)
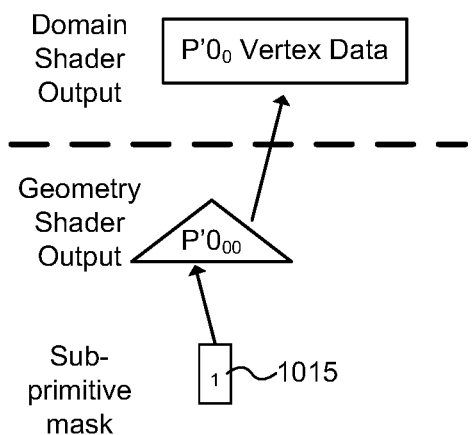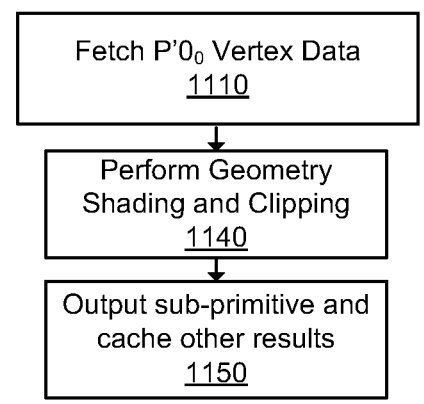
FIG. 11(A)       FIG. 11(B)

GRAPHICS PROCESSING METHOD AND SYSTEM FOR PROCESSING SUB-PRIMITIVES

BACKGROUND

Graphics processing systems are typically configured to receive graphics data, e.g. from an application running on a computer system, and to render the graphics data to provide a rendering output. For example, the graphics data provided to a graphics processing system may describe geometry within a three dimensional (3D) scene to be rendered, and the rendering output may be a rendered image of the scene. Some graphics processing systems (which may be referred to as "tile-based" graphics processing systems) use a rendering space which is subdivided into a plurality of tiles. The "tiles" are regions of the rendering space, and may have any suitable shape, but are typically rectangular (where the term "rectangular" includes square). As is known in the art, there are many benefits to subdividing the rendering space into tiles. For example, subdividing the rendering space into tiles allows an image to be rendered in a tile-by-tile manner, wherein graphics data for a tile can be temporarily stored "on-chip" during the rendering of the tile, thereby reducing the amount of data transferred between a system memory and a chip on which a graphics processing unit (GPU) of the graphics processing system is implemented.

Tile-based graphics processing systems typically operate in two phases: a geometry processing phase and a rasterisation phase. In the geometry processing phase (also referred to herein as a "tiling" phase), the graphics data for a render is analysed to determine, for each of the tiles, which graphics data items are present within that tile. Then in the rasterisation phase, a tile can be rendered by processing those graphics data items which are determined to be present within that tile (without needing to process graphics data items which were determined in the geometry processing phase to not be present within the particular tile).

FIG. 1 shows an example of a tile-based graphics processing system 100. The system 100 comprises a memory 102, geometry processing logic 104 and rasterisation logic 106. The geometry processing logic 104 and the rasterisation logic 106 may be implemented on a GPU and may share some processing resources. The geometry processing logic 104 comprises a geometry fetch unit 108, geometry transform logic 110, a cull/clip unit 112 and a tiling unit 114. The rasterisation logic 106 comprises a parameter fetch unit 116, a hidden surface removal (HSR) unit 118 and a texturing/shading unit 120. The memory 102 may be implemented as one or more physical blocks of memory, and includes a graphics memory 122, a transformed parameter memory 124, a control stream memory 126 and a frame buffer 128.

The geometry processing logic 104 performs the geometry processing phase (or tiling phase), in which the geometry fetch unit 108 fetches geometry data from the graphics memory 122 and passes the fetched data to the transform logic 110. The geometry data comprises graphics data items which describe geometry to be rendered. For example, the graphics data items may represent geometric shapes, which describe surfaces of structures in the scene, and which are referred to as "primitives". A common primitive shape is a triangle, but primitives may be other 2D shapes and may be lines or points also. Objects can be composed of one or more such primitives. Objects can be composed of many thousands, or even millions of such primitives. Scenes typically contain many objects. Some of the graphics data items may be control points which describe a patch to be tessellated to generate a plurality of tessellated primitives.

The transform logic 110 transforms the geometry data into the rendering space and may apply lighting/attribute processing as is known in the art. The resulting data is passed to the cull/clip unit 112 which culls and/or clips any geometry which falls outside of a viewing frustum. The resulting transformed geometric data items (e.g. the generated final transformed primitives to be used in rendering the tile) are provided to the tiling unit 114, and are also provided to the memory 102 for storage in transformed parameter memory 124. The tiling unit 114 generates control stream data for each of the tiles of the rendering space, wherein the control stream data for a tile includes identifiers of the transformed primitives which are to be used for rendering the tile, i.e. transformed primitives which are positioned at least partially within the tile. The control stream data for a tile may be referred to as a "display list" or an "object list" for the tile. The control stream data for the tiles is provided to the memory 102 for storage in the control stream memory 126. Therefore, following the geometry processing phase, the transformed primitives to be rendered are stored in the transformed parameter memory 124 and the control stream data indicating which of the transformed primitives are present in each of the tiles is stored in the control stream memory 126.

In the rasterisation phase, the rasterisation logic 106 renders the primitives in a tile-by-tile manner. The parameter fetch unit 116 receives the control stream data for a tile, and fetches the indicated transformed primitives from the transformed parameter memory 124, as indicated by the control stream data for the tile. The fetched transformed primitives are provided to the hidden surface removal (HSR) unit 118 which removes primitive fragments which are hidden (e.g. hidden by other primitive fragments). Methods of performing hidden surface removal are known in the art. The term "fragment" refers to a sample of a primitive at a sampling point, which is to be processed to render pixels of an image. In some examples, there may be a one to one mapping of fragments to pixels. However, in other examples there may be more fragments than pixels, and this oversampling can allow for higher quality rendering of pixel values, e.g. by facilitating anti-aliasing and other filtering that may be applied to multiple fragments for rendering each of the pixel values. Primitives which are not removed by the HSR unit 118 are provided to the texturing/shading unit 120, which applies texturing and/or shading to primitive fragments. Although it is not shown in FIG. 1, the texturing/shading unit 120 may receive texture data from the memory 102 in order to apply texturing to the primitive fragments, as is known in the art. The texturing/shading unit 120 may apply further processing to the primitive fragments (e.g. alpha blending and other processes), as is known in the art in order to determine rendered pixel values of an image. The rasterisation phase is performed for each of the tiles, such that the whole image can be rendered with pixel values for the whole image being determined. The rendered pixel values are provided to the memory 102 for storage in the frame buffer 128. The rendered image can then be used in any suitable manner, e.g. displayed on a display or stored in memory or transmitted to another device, etc.

The amount of geometry data used to represent scenes tends to increase as the complexity of computer graphics applications (e.g. game applications) increases. This means that in the system of FIG. 1, the amount of transformed geometry data which is provided from the geometry processing logic 104 to the memory 102 and stored in the transformed parameter memory 124 increases. This transfer of data from the geometry processing logic 104 (which is typically implemented "on-chip") to the memory 102 (which is typically implemented "off-chip" as system memory) can be a relatively slow process (compared to other processes involved in rendering the geometry data) and can consume large amounts of the memory 102.

Therefore, as described in UK Patent Number GB2458488, some tile-based graphics processing systems can use "untransformed display lists", such that the control stream data for a tile includes indications to the input geometry data, i.e. the untransformed geometry data rather than the transformed geometry data. This means that the transformed geometry data does not need to be provided from the geometry processing logic to the system memory, or stored in the system memory. These systems implement a transform unit in the rasterisation logic because the geometry data fetched by the rasterisation logic is untransformed, but in some scenarios the benefits of avoiding the delay and memory usage of transferring the transformed primitives to the system memory and storing them in the system memory may outweigh the processing costs of performing a transformation in the rasterisation phase.

FIG. 2 shows an example of a system 200 which uses untransformed display lists, similar to that described in GB2458488. The system 200 is similar to the system 100 shown in FIG. 1, and comprises a memory 202, geometry processing logic 204 and rasterisation logic 206. The geometry processing logic 204 and the rasterisation logic 206 may be implemented on a GPU and may share some processing resources, as is known in the art. The geometry processing logic 204 comprises a geometry data fetch unit 208, geometry transform logic 210, a cull/clip unit 212 and a tiling unit 214. The rasterisation logic 206 comprises a fetch unit 216, rasterisation transform logic 230, a HSR unit 218 and a texturing/shading unit 220. The memory 202 may be implemented as one or more physical blocks of memory, and includes a graphics memory 222, a control stream memory 226 and a frame buffer 228.

In contrast to FIG. 1, the fetch unit 208 might fetch only data used to compute position of the graphics data items (e.g. primitives) because other data of the graphics data items (e.g. colour data or texture data to be applied during rendering to the graphics data items, etc.) is not needed by the geometry processing logic 204. This is different to the system 100 in which all of the data for graphics data items is fetched by the fetch unit 108. The transform logic 210 transforms the position data of the graphics data items into the rendering space, and the resulting data is passed to the cull/clip unit 212 which culls and/or clips any graphics data items which fall outside of a viewing frustum. The tiling unit 214 generates control stream data for each of the tiles of the rendering space, wherein the control stream data for a tile includes identifiers of graphics data items which are to be used for rendering the tile, e.g. primitives which, when transformed, are positioned at least partially within the tile. The identifiers in the control stream data identify input graphics data items, i.e. graphics data items stored in the graphics memory 222. This is different to the system 100 shown in FIG. 1 in which the identifiers in the control stream data identify transformed primitives stored in the transformed parameter memory 124. The control stream data for the tiles is provided to the memory 202 for storage in the control stream memory 226.

In the rasterisation phase, the fetch unit 216 of the rasterisation logic 206 receives the control stream data for a tile from the control stream memory 226, and fetches the indicated input graphics data items from the graphics memory 222, as indicated by the control stream data for the tile. The input graphics data items are untransformed. The transform logic 230 transforms the fetched graphics data items into the rendering space. The transformed graphics data items are provided to the HSR unit 218 which performs HSR to remove primitive fragments which are hidden. The texturing and shading unit 220 then performs processing such as texturing and/or shading to primitive fragments which are not removed by the HSR unit 218. The HSR unit 218 and the texturing and shading unit 220 operate in a similar manner to the corresponding units 118 and 120 of the system 100 shown in FIG. 1 and described above. The resulting rendered pixel values are provided to the memory 202 for storage in the frame buffer 228 and can subsequently be used, e.g. displayed on a display or stored in memory or transmitted to another device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The system 200 described above is well-suited for processing graphics data items, such as primitives, which do not generate sub-primitives as they are rendered. However, the processing of many input graphics data items may result in the generation of multiple sub-primitives, for example through the process of geometry tessellation. The term "sub-primitive" is used herein to refer to a primitive that is generated by processing input graphics data items in the tiling phase. Therefore, sub-primitives are not stored in the graphics memory 222, but are generated from the input graphics data items fetched from graphics memory 222.

For example, where the input graphics data items are control points describing a patch to be tessellated, then the tessellation of the control points can produce many sub-primitives (e.g. two, tens, hundreds or thousands of sub-primitives). Furthermore, other operations such as geometry shading and clipping may be performed on graphics data items to generate further sub-primitives. Since the system 200 uses control stream data which includes identifiers of input graphics data items stored in the graphics memory 222, the geometry processing stages that are used to determine sub-primitives from the input graphics data items need to be performed in both the geometry processing phase and the rasterisation phase in system 200. Therefore some geometry processing is duplicated.

There is provided a graphics processing system configured to use a rendering space which is subdivided into a plurality of tiles, the graphics processing system comprising: geometry processing logic comprising: geometry transform and sub-primitive logic configured to receive graphics data of input graphics data items, and to determine transformed positions within the rendering space of one or more sub-primitives derived from the input graphics data items using a plurality of shader stages; and a tiling unit configured to generate control stream data including sub-primitive indications to indicate which of the sub-primitives are to be used for rendering each tile; and wherein the geometry processing logic is configured to write to a memory, for each instance of a pre-determined shader stage, shader stage output data comprising data output from each instance of the pre-determined shader stage used to process the received graphics data.

There is provided a graphics processing system configured to use a rendering space which is subdivided into a plurality of tiles, the graphics system comprising: rasterisation logic configured to generate a rendering output for each of the tiles, the rasterisation logic comprising: a fetch unit configured to fetch shader stage output data comprising data output from an instance of a pre-determined shader stage of a plurality of shader stages used to process graphics data of input graphics data items during a tiling phase to generate a transformed sub-primitive present in at least one tile; rasterisation transform and sub-primitive derivation logic configured to derive, from the fetched shader stage output data, transformed sub-primitives within the rendering space to be used for rendering a particular tile, and wherein the sub-primitives are derived in accordance with sub-primitive indications in control stream data that indicates which of the sub-primitives are to be used for rendering each tile; and one or more processing units for rendering the derived sub-primitives, to thereby generate a rendering output for the particular tile.

There is provided a graphics processing method for a graphics processing system configured to use a rendering space which is subdivided into a plurality of tiles, the graphics processing method comprising: receiving, using geometry transform and sub-primitive logic of geometry processing logic, graphics data of input graphics data items, and determining transformed positions within the rendering space of one or more sub-primitives derived from the input graphics data items using a plurality of shader stages; and generating, using a tiling unit of the geometry processing logic, control stream data including sub-primitive indications to indicate which of the sub-primitives are to be used for rendering each tile; and wherein the geometry processing logic is configured to write to a memory, for each instance of a pre-determined shader stage, shader stage output data comprising data output from each instance of the pre-determined shader stage used to process the received graphics data.

There is provided a graphics processing method for a graphics processing system configured to use a rendering space which is subdivided into a plurality of tiles, the graphics method comprising: generating, using rasterisation logic, a rendering output for each of the tiles, the generating comprising: fetching, using a fetch unit, shader stage output data comprising data output from an instance of a pre-determined shader stage of a plurality of shader stages used to process graphics data of input graphics data items during a tiling phase to generate a transformed sub-primitive present in at least one tile; deriving, using rasterisation transform and sub-primitive derivation logic, from the fetched shader stage output data, transformed sub-primitives within the rendering space to be used for rendering a particular tile, wherein the sub-primitives are derived in accordance with sub-primitive indications in control stream data that indicates which of the sub-primitives are to be used for rendering each tile; and rendering, using one or more processing units, the derived sub-primitives, to thereby generate a rendering output for the particular tile.

The graphics processing system may be embodied in hardware on an integrated circuit. There may be provided a method of manufacturing, at an integrated circuit manufacturing system, a graphics processing system. There may be provided an integrated circuit definition dataset that, when processed in an integrated circuit manufacturing system, configures the system to manufacture a graphics processing system. There may be provided a non-transitory computer readable storage medium having stored thereon a computer readable description of an integrated circuit that, when processed, causes a layout processing system to generate a circuit layout description used in an integrated circuit manufacturing system to manufacture a graphics processing system.

There may be provided an integrated circuit manufacturing system comprising: a non-transitory computer readable storage medium having stored thereon a computer readable integrated circuit description that describes the graphics processing system; a layout processing system configured to process the integrated circuit description so as to generate a circuit layout description of an integrated circuit embodying the graphics processing system; and an integrated circuit generation system configured to manufacture the graphics processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 10(A) and FIG. 10(B) illustrate a second example approach for generating a sub-primitive based on stored shader stage output data;

FIG. 11(A) and FIG. 11(B) illustrate a third example approach for generating a sub-primitive based on stored shader stage output data;

Figure 1:
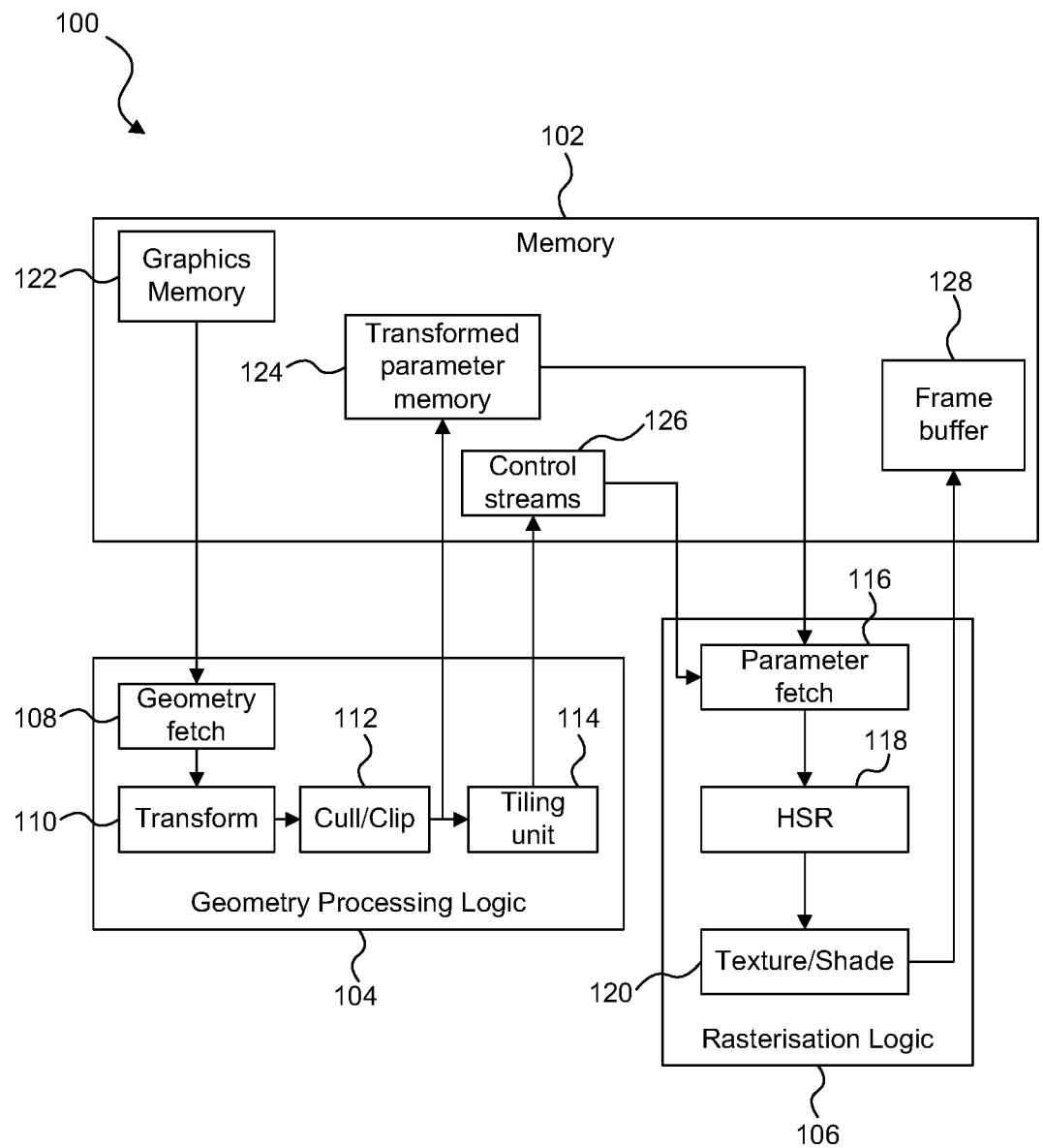
FIG. 1 shows an example of a first prior art graphics processing system which uses transformed display lists.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

Figure 2:
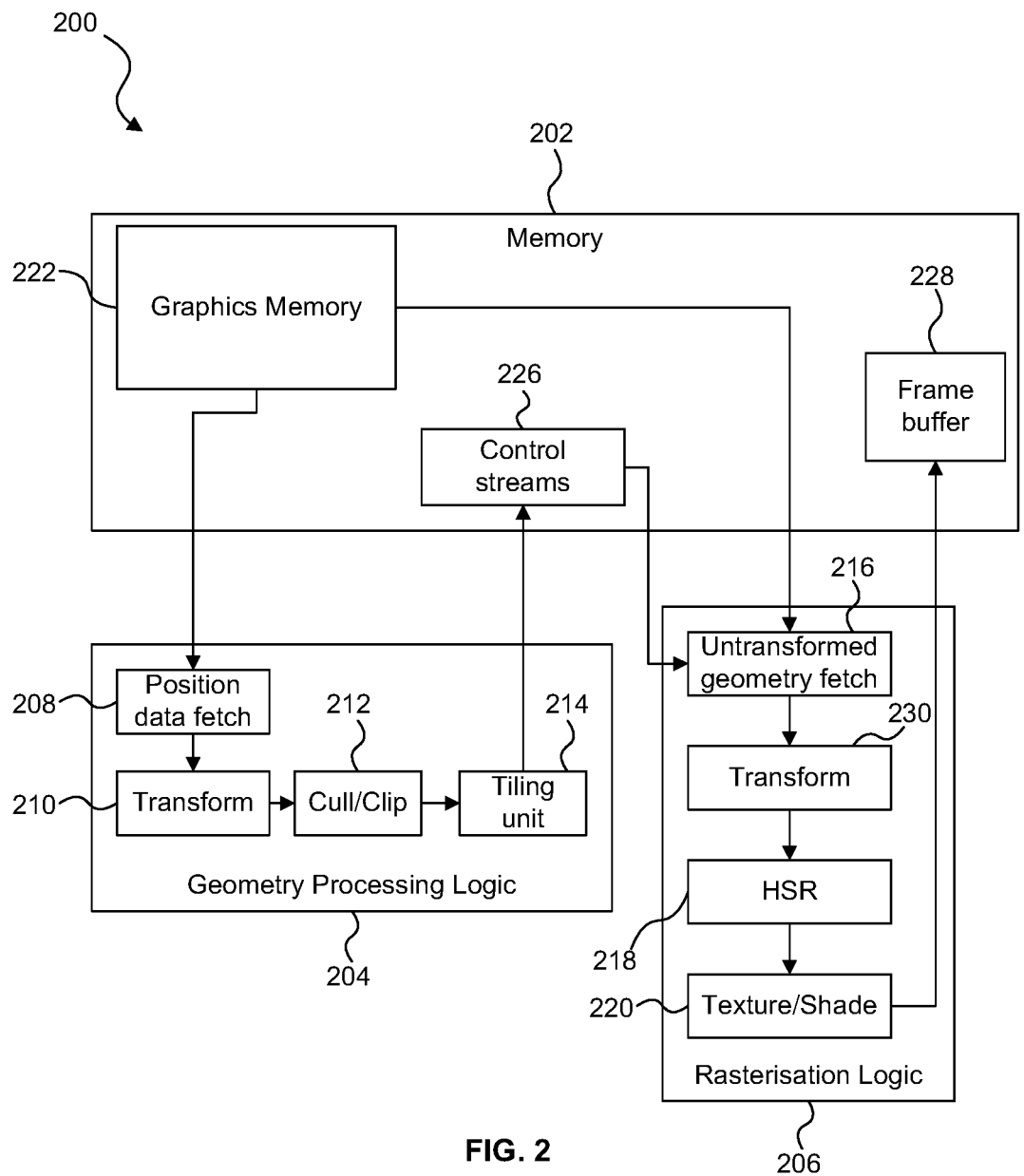
FIG. 2 shows an example of a second prior art graphics processing system which uses untransformed display lists.

Tile-based graphics processing systems may utilise untransformed display lists as described in relation to FIG. 2. In such arrangements, when sub-primitives are generated from input graphics data items in a graphics processing system which uses untransformed display lists, the geometry processing logic generates, for a tile, control stream data which also includes sub-primitive indications to indicate which of the sub-primitives are to be used for rendering the tile. The rasterisation logic can then derive sub-primitives (i.e. the transformed geometry) to be used for rendering a particular tile in accordance with the sub-primitive indications in the control stream data for the particular tile. In this way the rasterisation logic can avoid performing operations (e.g. shader operations, tessellations or clipping operations) which the control stream data indicates do not result in the generation of any sub-primitives which are to be rendered within the particular tile. The amount of processing involved in the generation of sub-primitives in the rasterisation phase can therefore be reduced based on information about the positions of sub-primitives determined during the geometry processing phase. For example, the rasterisation logic can avoid performing operations (e.g. shader operations, tessellations or clipping operations) for sub-primitives which the control stream data indicates are not required in rendering the particular tile.

In UK patent application publication number GB2542133, a hierarchical cache scheme is set forth which may be used to store in the rasterisation phase a hierarchy of graphics data items, for example including input graphics data items and the outputs of geometry processing stages implemented to derive the sub-primitives from the input graphics data items. Lookup into the hierarchical caching scheme operates in a bottom-up manner, such that if a transformed final sub-primitive output from a clipping stage is stored in the cache then it can be retrieved from the cache without performing any of the geometry processing stages that are implemented to generate the sub-primitive from the input graphics data items in the tiling phase. If the sub-primitive is not stored in the cache, then an attempt is made to retrieve graphics data items from the next level up in the hierarchy from the cache which can be used to derive the sub-primitive. The cache lookups continue up the hierarchy until either the sub-primitive can be derived, or the sub-primitive cannot be derived from the data stored in the cache. If the sub-primitive cannot be derived from the data stored in the cache, then input graphics data items are fetched from the graphics memory and used to derive the sub-primitives by executing invocations/instances of a sequence of geometry processing stages. When a geometry processing stage is executed, a result of the processing stage is stored in the cache for subsequent use. The caching scheme can be used across different primitives and across different tiles in the rasterisation phase. The use of the caching scheme reduces the number of performed data fetches from memory and reduces the number of processing stages which are performed in rasterisation. That is, shader outputs and clipper outputs can be shared across different primitives and/or across different tiles. The bottom-up manner in which the cache is accessed reduces the number of processing stages which are performed to derive sub-primitives within the particular tile. It is noted that in the geometry processing phase the primitive processing order is from top downwards through the hierarchy to generate sub-primitives for the entire render space; whereas in the rasterisation phase the data is processed in tiles and the primitive processing order is from bottom upwards with respect to the hierarchy and only for the sub-primitives which are in a particular tile currently being rendered. The hierarchical cache scheme is suited to the way in which primitives are processed in the rasterisation phase, and not so suited to the way in which primitives are processed in the geometry processing phase.

Figure 3:
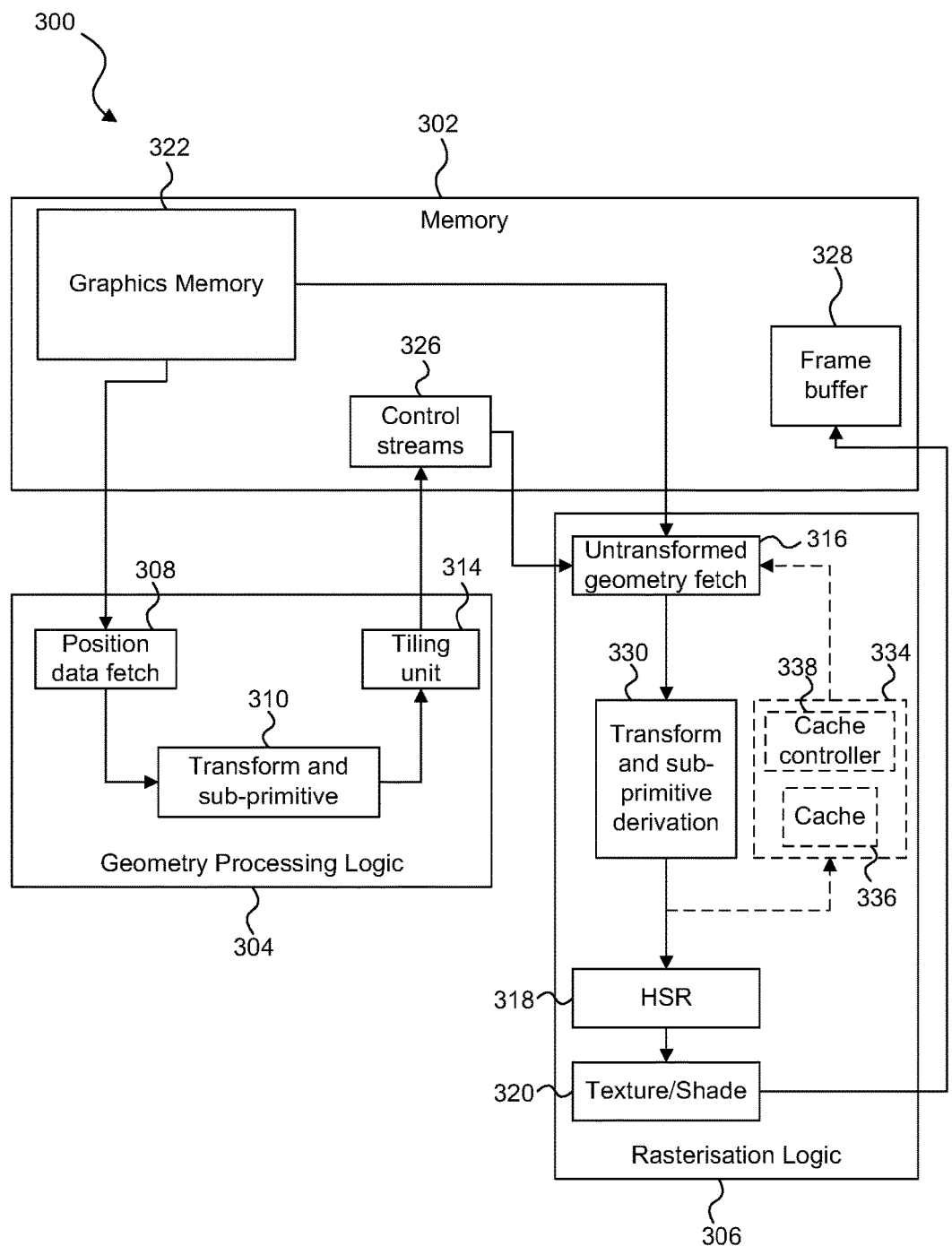
FIG. 3 shows an example of a third graphics processing system which uses untransformed display lists.

FIG. 3 shows a graphics processing system 300 that implements the hierarchical cache scheme. The system 300 is similar to the system 200 shown in FIG. 2, but includes components for deriving sub-primitives. In particular, system 300 comprises a memory 302, geometry processing logic 304 and rasterisation logic 306. The geometry processing logic 304 comprises a geometry data fetch unit 308, geometry transform and sub-primitive logic 310, and a tiling unit 314. The rasterisation logic 306 comprises a fetch unit 316, rasterisation transform and sub-primitive derivation logic 330, a HSR unit 318, and a texturing/shading unit 320. The rasterisation logic 306 may comprise a cache system 334 which includes a cache 336 and a cache controller 338. The memory 302 may be implemented as one or more physical blocks of memory, and includes a graphics memory 322, a control stream memory 326 and a frame buffer 328. Further detail relating to the operation of the cache scheme of FIG. 3 can be found in GB2542133.

In general, in the approach of FIG. 3, the cache system is used to reduce the amount of geometry processing that is duplicated in the rasterisation phase by storing in the cache intermediate data representing outputs of one or more of the geometry processing stages for local access. However, it has been appreciated by the inventors that the cache system is complex to implement since many different levels of caching can be required in the rasterisation phase. For example, it may be that many different pools of memory are required for storing different geometry processing outputs. Embodiments of the present application provide an improved approach to geometry processing for tile-based graphics processing systems.

The approaches described with reference to FIGS. 1 to 3 provide alternative approaches to handling the transfer of geometry data between a tiling phase and a rasterisation phase in a tile-based graphics processing system. A first approach set out in relation to FIG. 1 involves storing a set of transformed geometry in transformed parameter memory 124. The transformed geometry has been fully processed by the geometry processing logic including cull/clip processes. Accordingly, when the transformed geometry is fetched by the parameter fetch module 116, little or no geometry processing is necessary in the rasterisation phase. For example, the retrieved geometry may be immediately used without further processing for hidden surface removal and pixel shading processes.

In an alternative approach set out in relation to FIG. 2, in the tiling phase the untransformed geometry data provided by an application is processed in order to determine in which tiles transformed geometry is at least partially located. Rather than storing transformed geometry data into a transformed parameter memory (as in FIG. 1), this approach does not store transformed geometry into memory after tiling has been completed. Instead, the control streams reference the original untransformed geometry stored in the graphics memory as provided by the application. Then, during the rasterisation phase, for each control stream, the original untransformed geometry referenced in a control stream is again retrieved from graphics memory and the geometry processing steps are repeated to generate transformed geometry that is at least partially located in the tile, which is then processed to render the tile. This approach results in reduced write bandwidth into memory after the tiling phase and potentially less memory storage compared with the arrangement of FIG. 1. However, the approach of FIG. 2 results in a potentially greater read bandwidth, since the same untransformed geometry may be required for more than one tile. In addition, a duplication in geometry processing is required during the rasterisation phase using the approach of FIG. 2. An improvement to the arrangement of FIG. 2 has been proposed in FIG. 3, which seeks to reduce some of the memory read bandwidth during the rasterisation phase and to reduce the amount of duplicated geometry processing in the rasterisation phase.

Instead of relying wholly on transformed geometry data or the original untransformed geometry data, the arrangement of FIG. 3 recognises that it is possible to store in a cache some of the results generated by repeating geometry processing during the rasterisation phase. This allows other geometry operations that need to be re-performed during the rasterisation phase to lookup the processed geometry from the cache without having to read the untransformed geometry from memory and/or without having to re-perform some of the geometry processing steps.

In examples of the present disclosure, the inventors have recognised that a further architectural approach is possible. In examples of the present disclosure, data that represents a partially processed result from performing the geometry processing of the untransformed geometry during the tiling phase can be stored in the memory at the end of the tiling phase. Put another way, the geometry processing performed during the tiling phase to transform the geometry is performed in a number of geometry processing stages (e.g. the different geometry processing stages of vertex shading, hull shading, domain shading, geometry shading and optionally clip/cull processes). In this approach an output of a particular geometry processing stage (herein referred to as a "shader stage") can be stored to memory. As a result, during the rasterisation phase the output of a shader stage derived from processing untransformed geometry can be retrieved from memory and used during rasterisation, thus allowing that shader stage to be skipped during the rasterisation phase.

The examples of the present disclosure allow some of the duplicated geometry processing during the tiling and rasterisation phases to be skipped in the rasterisation phase for a relatively low increase in the amount of data written to memory during the tiling phase. In particular, the inventors have recognised that the tessellation process that is undertaken as part of the geometry processing performed in the tiling phase can significantly increase the amount of data that needs to be stored as the process proceeds through its steps. In particular, the output of the fixed function tessellator block (which is a stage of the geometry processing that performs tessellation before the domain shader and before the geometry shader) can produce a significant number of individual vertices (up to 4225) for a given patch which can thus significantly increase the amount of data to be stored in memory between phases. However, some stages of the geometry processing pipeline produce a relatively small amount of data. For example, a vertex shader (an example of a shader stage in the geometry processing performed during the tiling phase) is a per-vertex shader that produces a single transformed control point for each input control point. As a result there is little expansion of data resulting from the shading of a vertex using the vertex shader. Similarly, a hull shader (an example of a shader stage in geometry processing that is defined in the Direct3D standards) produces a number of different outputs, including patch control points, patch constant data, and tessellation factors which are to be consumed by a subsequent domain shader. However, the outputs of these individual shader stages are smaller in size than the size of the transformed geometry that would be stored in memory according to the arrangement described above in relation to FIG. 1. Such output data for a particular shader stage can be stored in memory between the tiling and rasterisation phases. As a result, the shader stages (and any other preceding shader stages) that produce this output data can be skipped when processing the data during the rasterisation phase. A shader stage as identified herein refers to a geometry processing stage of a plurality of geometry processing stages used to process data in the tiling phase—for example in performing tessellation. For example, the shader stages include one or more of vertex shading, hull shading, tessellation, domain shading, geometry shading, and clipping/culling. These stages may correspond, for example, to stages as defined in the Direct3D and/or OpenGL standards for performing tessellation.

Figure 4:
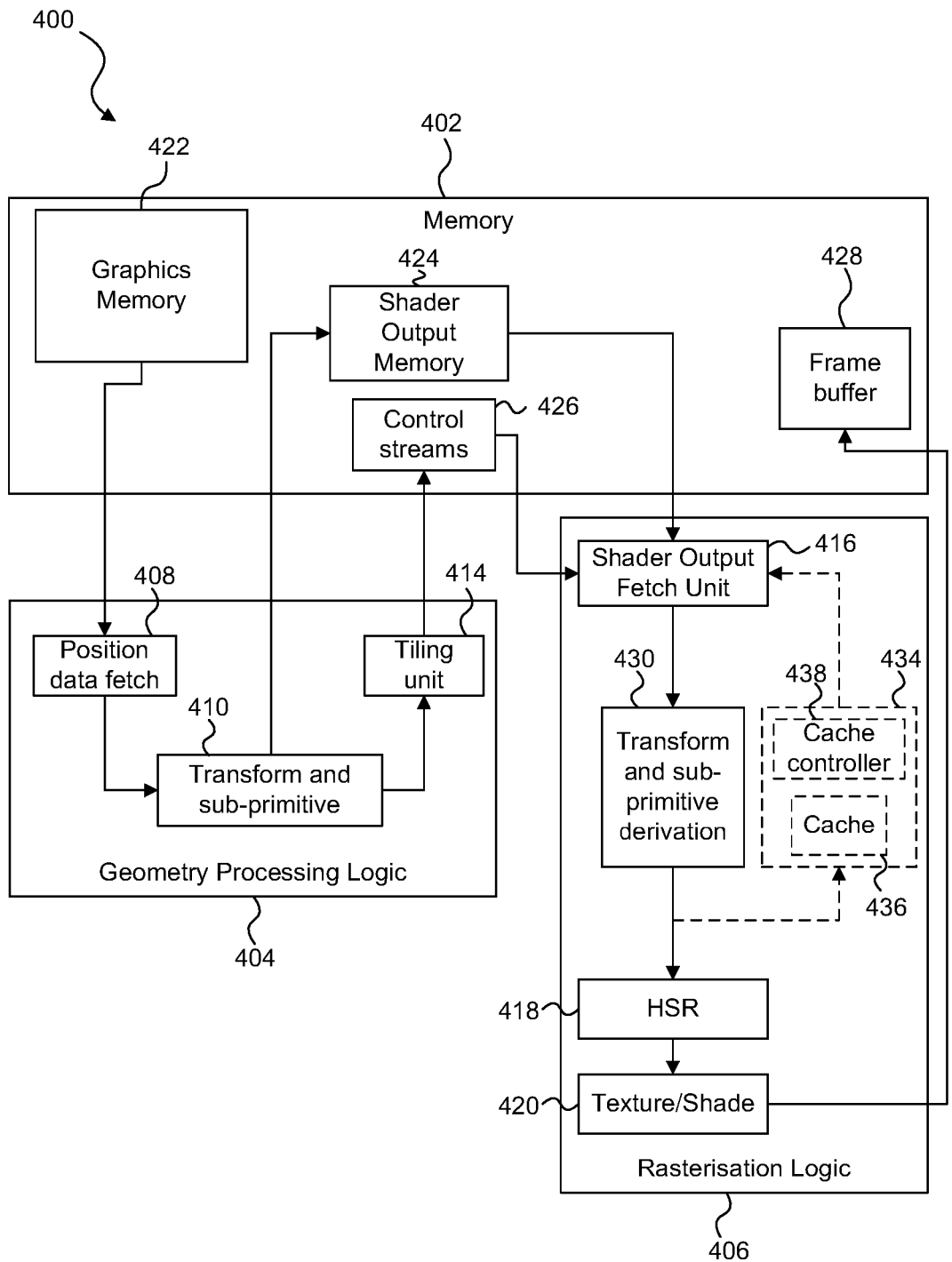
FIG. 4 shows an example graphics processing system according to embodiments described herein.

The approach described above will be set out in further detail below, in relation to FIG. 4. The arrangement of FIG. 4 is similar to the arrangement of FIG. 3 and like-reference signs indicate like-elements of the graphics processing system 400. In contrast to the arrangement of FIG. 3, the arrangement of FIG. 4 includes shader output memory 424 which is configured to store data representing the output of at least one invocation/instance of a shader stage performed during the tiling phase. As described previously, the transform and sub-primitive logic 410 is configured to process the received position data to generate transformed geometry for use by the tiling unit 414 in tiling the scene. During the processing performed by the transform and sub-primitive logic 410, one or more shader stages are used to process the geometry as will be described in more detail later. The transform and sub-primitive logic 410 may be configured to output data representing the output of one or more shader stages for storage in shader output memory 424.

Furthermore, in contrast to the arrangement of FIG. 3, the rasterisation logic 406 of FIG. 4 comprises a shader output fetch unit 416 which is configured to replace the untransformed geometry fetch unit 316. The shader output fetch unit 416 is configured to retrieve, during the rasterisation phase, data representing the output of one or more shader stage outputs from the shader output memory 424 based on the sub-primitive indications in the display lists for each tile. In particular, the output data for shader stages which resulted in sub-primitives present in the particular tile are retrieved from the shader output memory 424. The retrieved data from the shader output memory 424 is then passed to the transform and sub-primitive derivation logic 430. The transform and sub-primitive derivation logic 430 is configured to generate data relating to transformed sub-primitives based on the shader output data for use by HSR unit 418 in performing hidden surface removal. Since the received data in FIG. 4 comprises outputs from one or more shader stages (instead of the untransformed geometry as in FIG. 3), the transform and sub-primitive derivation logic 430 does not need to implement shader stages that include or precede the shader stage that produced the output data stored in memory 424. Accordingly, when compared with the transform and sub-primitive derivation logic 330 of FIG. 3, the transform and sub-primitive derivation logic 430 of FIG. 4 can include fewer shader stages and is thus simpler and more efficient in generating sub-primitives. For example, where the graphics processing system 400 is configured to store data representing the output from hull shader invocations/instances in shader output memory 424, it is not necessary for the transform and sub-primitive derivation logic 430 to implement or operate a vertex shader stage or a hull shader stage in the rasterisation phase. It is noted that in some other examples, the rasterisation logic could fetch some untransformed geometry from the graphics memory 422.

As will be explained in more detail later, the cache system 434 comprises a cache controller 438 and cache 436. The cache system 434 is similar in operation to the cache system 334 previously described with reference to FIG. 3. Since transform and sub-primitive derivation logic 430 contains fewer shader stages (when compared with the transform and sub-primitive derivation logic 330 shown in FIG. 3), cache system 434 is able to store fewer shader stage outputs as intermediate data.

Figure 5:
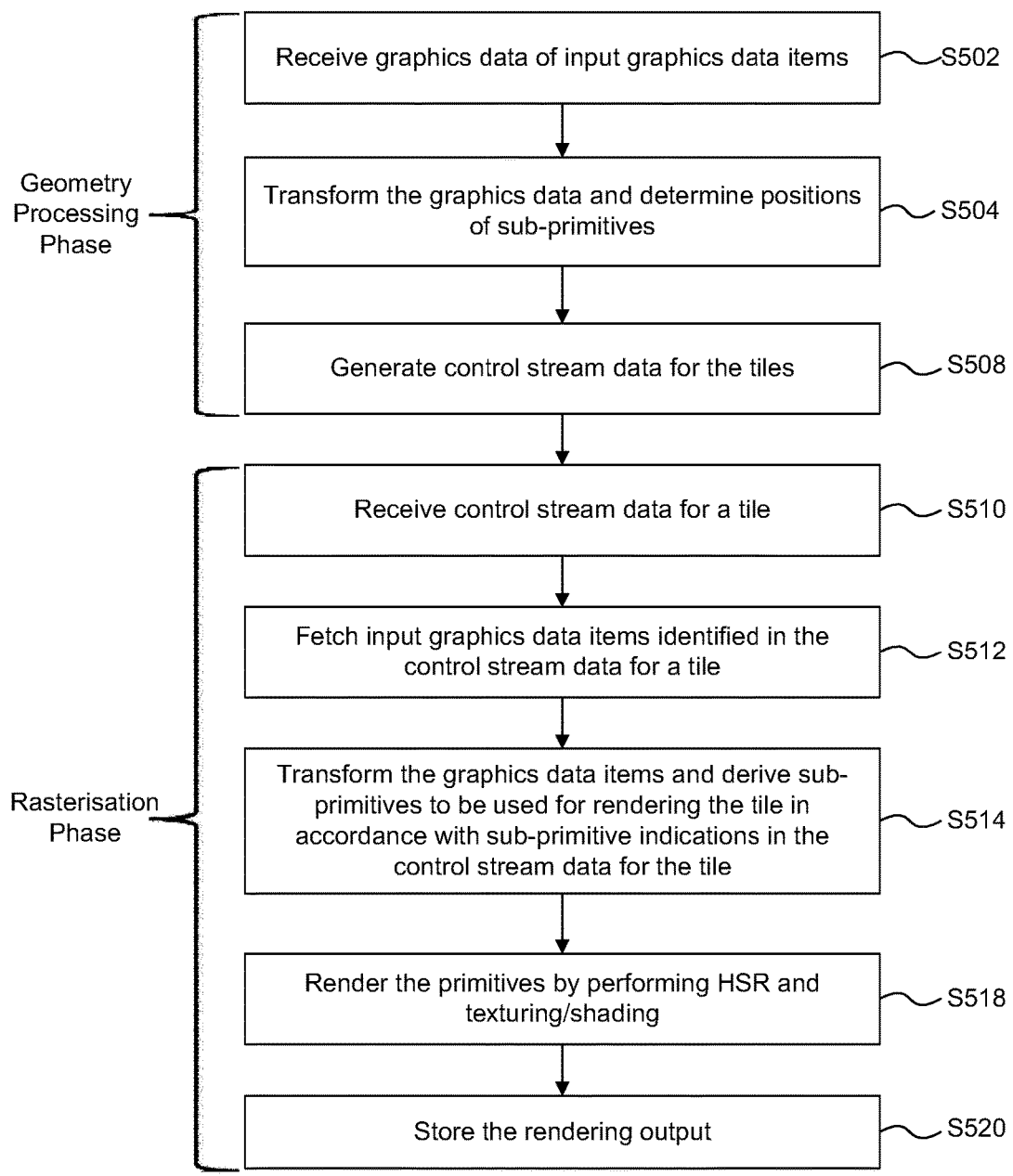
FIG. 5 is a flow chart showing a method of generating a rendering output in a graphics processing system according to FIG. 3.

FIG. 5 is a flow chart illustrating in further detail the operation of the graphics processing system of FIG. 3. In step S502 the geometry data fetch unit 308 fetches geometry data from the graphics memory 322 and passes the fetched data to the transform and sub-primitive logic 310. The fetched data may be "position data" which may include data for use in computing the position of graphics data items. For example, the fetch unit 308 might fetch only position data of the graphics data items. As described above, the graphics data items may for example be primitives or control points describing a patch to be tessellated.

In step S504 the transform and sub-primitive logic 310 transforms the position data of the graphics data items into the rendering space. Further in step S404 the transform and sub-primitive logic 310 determines transformed positions within the rendering space of one or more sub-primitives derived from the input graphics data items. Step S504 may involve performing a number of different functions because sub-primitives may be derived from the input graphics data items in a number of different ways. In particular, the transform and sub-primitive logic 310 may comprise one or more processing modules for deriving the transformed sub-primitives from the input graphics data items, e.g. a vertex shading module, a geometry shading module and/or a tessellation module. The transform and sub-primitive logic 310 also comprises a clip/cull unit which is similar to the clip/cull units described above in relation to FIGS. 1 and 2. The positions of sub-primitives derived by the transform and sub-primitive logic 310, and the transformed position data of graphics data items from which no sub-primitives are derived, are provided to the cull/clip unit for clipping and/or culling of graphics data items which do not fall completely within the rendering space.

Figure 6:
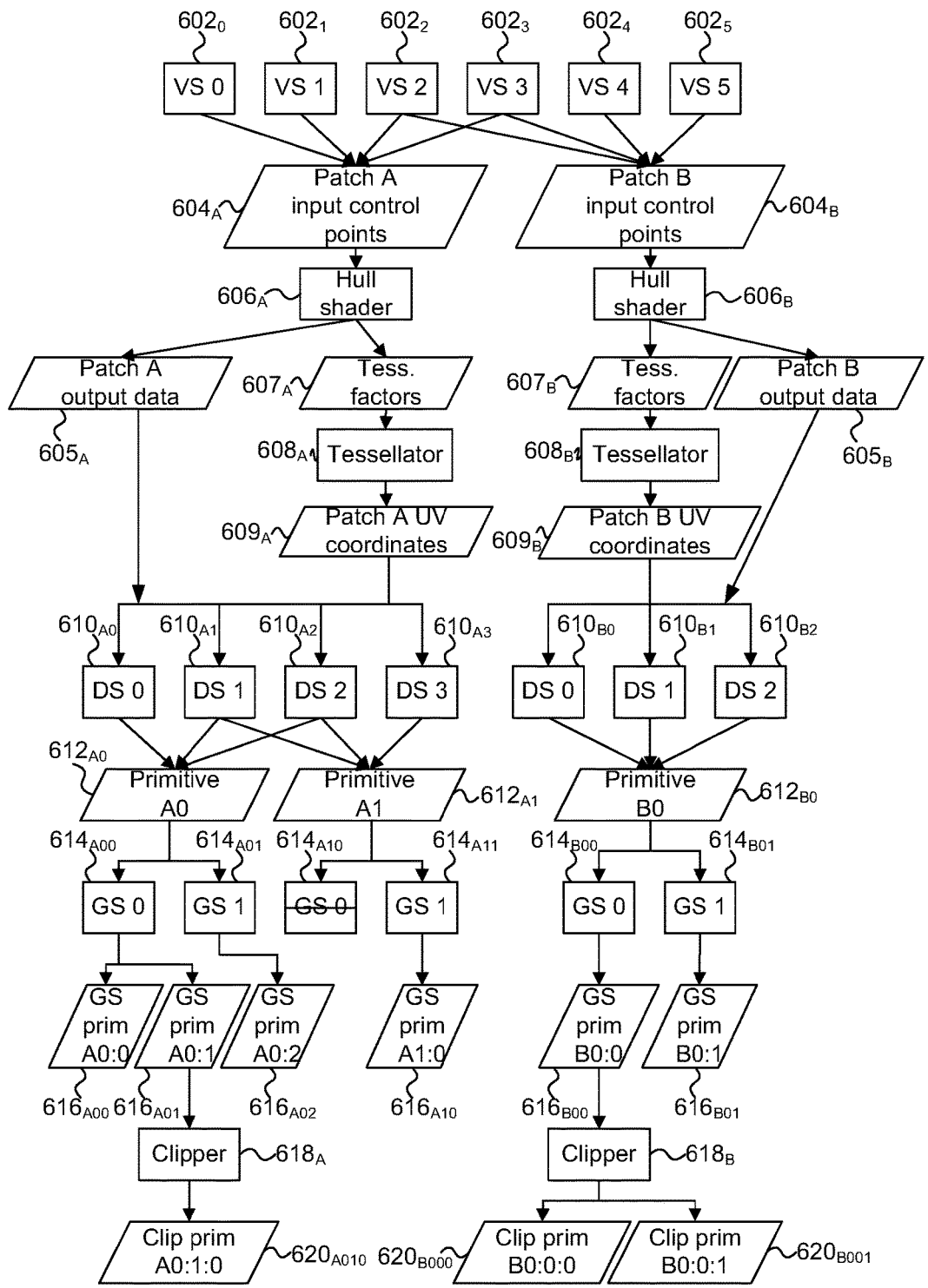
FIG. 6 shows an example of a sequence of processing stages used to generate sub-primitives.

FIG. 6 shows an example of a sequence of geometry processing stages by which sub-primitives are derived from input graphics data items that is applicable to the systems of all of FIGS. 1 to 4. Rectangles represent operations while parallelograms represent their inputs and outputs. The output of an operation can be read as an input by multiple operations in the lower levels of the hierarchy. The examples described herein refer to the transform and sub-primitive logic 110, 210, 310, 410 acting on graphics data items, without explicitly saying, although it is to be understood to be the case, that it is the position data of those graphics data items on which the transform and sub-primitive logic acts. FIG. 6 shows two patches ($604_A$ and $604_B$) which both include four input control points. Two of the control points are shared by both of the patches 604, such that there are six different control points in the example shown in FIG. 6. A respective vertex shader instance ($602_0$ to $602_5$) is used by the transform and sub-primitive logic to transform the six control points into the rendering space. The outputs from vertex shaders $602_0$ to $602_3$ describe the first patch $604_A$, and the outputs from vertex shaders $602_2$ to $602_5$ describe the second patch $604_B$. These outputs from the vertex shader stage output data which may be stored in shader output memory 424 in the arrangement of FIG. 4.

The transform and sub-primitive logic may implement two instances of a hull shader $606_A$ and $606_B$ (one for each of the patches $604_A$ and $604_B$) and two instances of a fixed-function tessellator $608_A$ and $608_B$. Each hull shader instance ($606_A$ and $606_B$) generates tessellation factors ($607_A$ and $607_B$), which define the tessellated primitives representing the respective patches $604_A$ and $604_B$. The hull shader instances ($606_A$ and $606_B$) also generate other patch output data ($605_A$ and $605_8$) including the output control points and the patch constant data to be used in a domain shader. This data may also form the hull shader stage output data which may be stored in shader output memory 424 in the arrangement of FIG. 4. The hull shader instances 606 prepare the tessellation factors $607_A$ and $607_B$, and the tessellators 608 perform the tessellation to generate the vertex UV coordinates $609_A$ and $609_B$ that define the tessellated primitives in the domain space. These outputs from the fixed function tessellators may also form shader stage output data that may be stored in memory 424.

In the simple example shown in FIG. 6, the patch A $604_A$ produces two tessellated primitives, while patch B $604_B$ produces one tessellated primitive (due to different tessellation factors). It should be apparent that in other examples different numbers of primitives may be produced by the tessellation, and in particular many more than two primitives may be produced, e.g. tens, hundreds or even thousands of primitives may be produced by tessellating a patch. Vertex data for vertices of tessellated primitives (which are defined by the vertex UV coordinates 609 from tessellators 608, and the output control points and other graphics patch data items 605 from hull shaders 606) are input into the domain shader instances 610 which are used to manipulate the tessellated vertices, e.g. to apply a height map to the vertices, etc. The transform and sub-primitive logic 410 may for example implement seven instances of a domain shader ($610_{A0}$ to $610_{A3}$ and $610_{B0}$ to $610_{B2}$) which apply respective transforms to the vertices of the tessellated primitives representing the patches $604_A$ and $604_B$. The transformed vertices provided by domain shaders $610_{A0}$, $610_{A1}$ and $610_{A2}$ represent tessellated primitive $612_{A0}$. The transformed vertices provided by domain shaders $610_{A1}$, $610_{A2}$ and $610_{A3}$ represent tessellated primitive $612_{A1}$. The transformed vertices provided by domain shaders $610_{B0}$, $610_{B1}$ and $610_{B2}$ represent tessellated primitive $612_{B0}$. It is noted that vertices for tessellated primitives produced from the same patch can be shared (e.g. primitives $612_{A0}$ and $612_{A1}$ share two vertices). The tessellated primitives ($612_{A0}$, $612_{A1}$ and $612_{B0}$) generated by the tessellation stages may form the output data for the domain shader stage, which may be stored in memory 424 in the arrangement of FIG. 4.

The domain shader outputs are fed into a geometry shader (GS) stage of the transform and sub-primitive logic, which is configured to run two instances of a geometry shader per primitive. The number of primitives generated by each GS instance varies from 0 to an upper bound specified by the application (e.g. up to 256) depending on the operation that the GS instances are arranged to perform. In the simple example shown in FIG. 6, from 0 to 2 primitives are produced by each of the GS instances. In particular, the GS instance $614_{A00}$ is applied to the primitive $612_{A0}$ and produces two primitives $616_{A00}$ and $616_{A01}$, the GS instance $614_{A01}$ is applied to the primitive $612_{A0}$ and produces one primitive $616_{A02}$, the GS instance $614_{A10}$ is applied to the primitive $612_{A1}$ and produces zero primitives; the GS instance $614_{A11}$ is applied to the primitive $612_{A1}$ and produces one primitive $616_{A10}$; the GS instance $614_{B00}$ is applied to the primitive $612_{B0}$ and produces one primitive $616_{B00}$; and the GS instance $614_{B01}$ is applied to the primitive $612_{B0}$ and produces one primitive $616_{B01}$. In some examples, the geometry data for the primitives output from the geometry shader may also form shader stage output data that is stored in memory 424.

As described above, the transform and sub-primitive logic can clip some of the primitives if they extend outside of the viewing frustum, but some of the GS generated primitives are not clipped in the example shown in FIG. 6. For example, when a primitive is clipped, up to fifteen sub-primitives (seventeen vertices) may be produced when using the six standard clipping planes and eight custom clipping planes. However, in the simple example shown in FIG. 6, the primitive $616_{A01}$ is clipped to produce one primitive $620_{A010}$ and the primitive $616_{B00}$ is clipped to produce two primitives $620_{B000}$ and $620_{B001}$. The primitives $616_{A00}$, $616_{A02}$, $616_{A10}$ and $616_{B01}$ are not clipped. The leaf nodes of the hierarchy (i.e. primitives $616_{A00}$, $620_{A010}$, $616_{A02}$, $616_{A10}$, $620_{B000}$, $620_{B001}$ and $616_{B01}$ in the example shown in FIG. 6) are the sub-primitives which are to be rendered. In some examples, input primitives may pass through the transform and sub-primitive logic without any sub-primitives being generated, such that the clipping may be applied to input primitives in some examples. Therefore, in general, the transform and sub-primitive logic may be configured to cull and/or clip graphics data items (including the derived sub-primitives) which are situated outside of a viewing frustum. The data output from the cull and/or clipping process may form shader stage output data that is stored in memory 424 in the arrangement of FIG. 4. The remaining primitives and sub-primitives are passed to the tiling unit.

The tiling unit generates control stream data for each of the tiles of the rendering space. The control stream data for a tile includes sub-primitive indications to indicate which of the sub-primitives are to be used for rendering the tile. A sub-primitive may be determined to be for use in rendering a tile if the sub-primitive is at least partially in the tile. As will be explained in more detail below, the sub-primitive indications can be used during the rasterisation phase to reduce the amount of processing which is performed to derive the sub-primitives for a tile. The sub-primitive indications may, for example, indicate how to derive the sub-primitives to be used for rendering a tile from the transformed input graphics data items. For example, the sub-primitive indications may indicate a sequence of processing operations which are performed on the input graphics data items in order to generate the sub-primitives which are to be rendered. The sub-primitive indications may take the form of a sub-primitive mask identifying which sub-primitives are present in the tile and which are not. The control stream data also identifies which particular invocations/instances of the shader stages were used to derive the sub-primitive. The data stored in memory between tiling and rasterisation phases therefore indicate, for a sub-primitive, the output data for at least one shader stage that was used to generate the sub-primitive and an identification of the particular shader stages used to generate the sub-primitive.

Based on the shader stage output data and the sub-primitive indications, the transform and sub-primitive derivation logic in the rasterisation phase can perform identified invocations/instances of the shader stages necessary to derive the sub-primitives to be rendered for a tile. For example, the sub-primitive indications in the control stream relating to the example shown in FIG. 6 may indicate that the GS instance $614_{A10}$ does not produce any primitives, in which case this GS instance might not be executed in the rasterisation phase. In contrast, for example for sub-primitive $620_{A010}$, there may be stored a reference (e.g. using a series of pointers) to the associated clipper invocation ($618_A$), GS invocation ($614_{A00}$), and DS invocations ($610_{A0}$, $610_{A1}$, and $610_{A2}$). In some cases, the related hull shader invocation ($606_A$) may also be referenced.

Furthermore, it may be the case that some of the sub-primitives which are the leaf nodes shown in FIG. 6 might not be positioned at least partially within a particular tile. For example, the primitive $616_{A02}$ might lie completely outside of a particular tile, in which case an indication of the sub-primitive $616_{A02}$ would not be included in the control stream data (e.g. a sub-primitive mask might indicate that the primitive is not present) for the particular tile. Therefore, in the rasterisation phase the rasterisation logic would not need to implement the geometry shader $614_{A01}$ or preceding shading stages in order to generate that primitive.

As mentioned, the sub-primitive indications could be represented as one or more masks. For example a mask for a sub-primitive may indicate which of a set of possible operations are to be performed to derive a sub-primitive. A mask may indicate which of a set of possible sub-primitives are culled or clipped. A mask may also indicate which sub-primitives derived from an original primitive are present in a tile, and which are not present in the tile.

The control stream data may be compressed, according to any suitable compression technique. The control stream data for the tiles is provided to the memory for storage in the control stream memory. The geometry processing phase is complete for the current render, and at a subsequent time, the rasterisation phase is performed to render the tiles of the rendering space using the input graphics data stored in the graphics memory and the control stream data stored in the control stream memory.

The rendering of a particular tile in the rasterisation phase is now described for the prior arrangement of FIG. 3. In step S510, the fetch unit of the rasterisation logic receives the control stream data for a tile from the control stream memory. In step S512 the fetch unit fetches the indicated input graphics data items from the graphics memory, as indicated by the identifiers in the control stream data for the tile. The input graphics data items are untransformed.

In some examples, the geometry processing logic (e.g. the transform and sub-primitive logic) may determine information describing how to group the input graphics data items into primitive blocks. This information can be passed as sideband information with the control streams. Therefore, the fetch unit can receive this sideband information with the control stream data for a tile and can generate primitive blocks including the fetched input graphics data items in accordance with the sideband information. The primitive blocks, combined with the sub-primitive indications in the control stream data, allow the sub-primitives to be regenerated in the rasterisation phase. In some other examples, sideband information indicating how the input graphics data items are to be grouped into primitive blocks does not need to be passed from the geometry processing logic to the rasterisation logic, and instead the fetch unit can determine how to group the input graphics data items into primitive blocks.

In step S514 the transform and sub-primitive derivation logic transforms the fetched graphics data items into the rendering space. The sub-primitive indications in the control stream data for the particular tile currently being rendered are also provided to the transform and sub-primitive derivation logic (this may be directly from the control stream memory or from the fetch unit). Further in step S514 the transform and sub-primitive derivation logic derives sub-primitives to be used for rendering the particular tile in accordance with the sub-primitive indications in the control stream data for the particular tile.

As described above, the sub-primitive indications in the control stream data may be used by the transform and sub-primitive derivation logic to selectively perform only those processes which are needed for deriving sub-primitives which are present within the particular tile. That is, the transform and sub-primitive derivation logic can use the sub-primitive indications to identify which processes are not necessary for deriving the sub-primitives in the tile, such that those unnecessary processes are not performed by the transform and sub-primitive derivation logic in the rasterisation phase. It is noted that those processes would have been performed by the transform and sub-primitive logic in the geometry processing phase in order to determine that they do not lead to sub-primitives which are present in the particular tile, but these processes do not need to be duplicated in the rasterisation phase. The sub-primitive indications in the control stream data may be hierarchical indices, wherein the sub-primitive indication for a particular sub-primitive indicates one or more graphics data items at different levels of a hierarchy (e.g. as shown in FIG. 6) for use in deriving the particular sub-primitive. The transform and sub-primitive derivation logic can use the hierarchical index for the particular sub-primitive to identify the one or more graphics data items of the hierarchy for use in deriving the particular sub-primitive. For example, the sub-primitive indication for primitive $620_{A010}$ as shown in FIG. 6 may be a hierarchical index which identifies that the primitive $620_{A010}$ is derived from a sequence of graphics data items including the patch input control points $604_A$, the patch output data $605_A$ in conjunction with the vertex UV coordinates $609_A$, the tessellation generated primitive $612_{A0}$ and the geometry shader generated primitive $616_{A01}$. This allows the transform and sub-primitive derivation logic 330 to easily identify the processing steps which are needed to derive a sub-primitive.

For example, with reference to FIG. 6, only primitives which were partially clipped in geometry processing phase (i.e. primitives $616_{A01}$ and $616_{B00}$ in the example shown in FIG. 6) need to be clipped again in the rasterisation phase, and the transform and sub-primitive derivation logic 330 can use the sub-primitive indications in the control stream data to determine that clipping does not need to be applied to other primitives, without further determination steps and without attempting to apply clipping to other primitives. As another example, the transform and sub-primitive derivation logic 330 in the rasterisation logic 306 can determine from the sub-primitive indications in the control stream data that the first GS instance $614_{A10}$ for tessellated primitive A1 does not generate any sub-primitives, therefore the execution of the GS instance $614_{A10}$ can be avoided in the rasterisation phase.

The transform and sub-primitive derivation logic 330 outputs the derived sub-primitives, and any input primitives for which sub-primitives are not derived, for rendering, in step S518, by one or more processing units to thereby generate a rendering output for the particular tile. In the example shown in FIG. 3, the processing units are the HSR unit 318 which removes primitive fragments which are hidden, and the texturing/shading unit 320 which applies one or both of texturing and shading to primitive fragments. However, in other examples, different processing may be performed to render the primitives and sub-primitives which are output from the transform and sub-primitive derivation logic 330. Furthermore, the example system 300 shown in FIG. 3 is a deferred rendering system in the sense that hidden surface removal is performed on a primitive fragment prior to texturing and/or shading of the primitive fragment. In other examples the system might not be a deferred rendering system such that hidden surface removal is performed on a primitive fragment subsequent to texturing and/or shading of the primitive fragment. The principles can be applied to non-deferred rendering system as well as to deferred rendering systems.

In step S520 the resulting rendered pixel values are provided to the memory for storage in the frame buffer and can subsequently be used, e.g. displayed on a display or stored in memory or transmitted to another device, etc.

Figure 7:
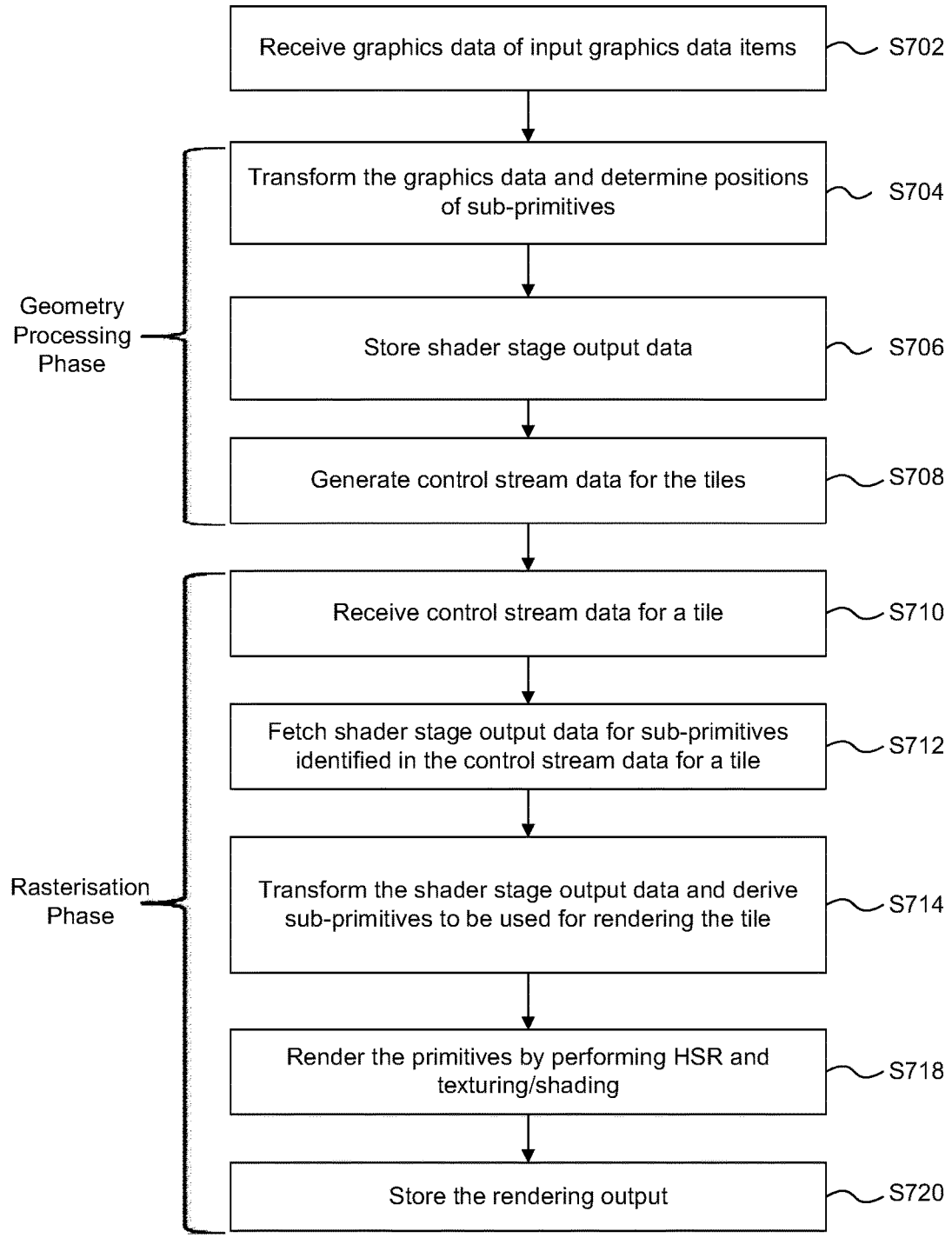
FIG. 7 is a flow chart showing a method of rendering a sub-primitive in a graphics processing system using a hierarchical cache according to the approach of FIG. 4.

FIG. 7 illustrates a flow chart that illustrates the operation of the graphics processing system of FIG. 4 in an example of the present disclosure. The method shown in the flow chart of FIG. 7 operates in a similar manner to the method shown in the flow chart of FIG. 5. In particular, control stream data is written to memory during the geometry processing phase and then read from memory in the rasterisation phase. The main differences between the methods shown in the flow charts of FIGS. 5 and 7 is that at step S706 of FIG. 7, shader stage output data is additionally stored into the shader output memory during the geometry processing phase (as part of the tiling phase) in addition to the control stream data. The shader stage output data may include the outputs generated by one or more shader stages (for example, excluding at least the final shader stage—e.g. excluding clipping/culling and/or geometry shading stages) during the geometry processing of each patch, examples of which have been discussed previously. The shader stage output data may include all of the data generated by a (non-final) shader stage during the geometry processing performed in the geometry processing phase that can be used to skip that same geometry processing shader stage during the subsequent rasterisation phase. Also, as mentioned, during the geometry processing phase, control stream data for the tiles is generated which may include sub-primitive indications. The sub-primitive indications can be used to identify the shader stage output data required to re-generate a sub-primitive during the rasterisation phase based upon shader stage output data. For example, the sub-primitive indications could indicate the sub-primitives located in each tile as well as the shader stage invocations that were used to generate that sub-primitive during the geometry processing phase. The identification of the shader stage invocations could be implemented, for example, using a hierarchical index as previously discussed. The sub-primitive indications could also indicate which of the shader stage invocations have output data stored in the shader output memory.

As illustrated in FIG. 7, in step S710, during the rasterisation phase the control stream data for a particular tile is read from the control stream memory 426. The control stream data comprises sub-primitive indications that are processed to identify the shader stage output data that is to be used to generate a sub-primitive and the shader stage invocations required to process that shader stage output data to generate the sub-primitive. Then, in step S712, the shader stage output data is fetched from the shader stage output memory 424. The shader stage output data is transformed in accordance with the sub-primitive indications and the sub-primitives to be used in rendering the tile are derived at S714. To do this, the shader stage output data is processed in identified shader stage invocations. For example, the shader stage output data may represent the outputs of one or more vertex shaders run during the geometry processing phase. The vertex data generated during the geometry processing phase and stored in memory may be read and processed using a hull shader, domain shader, and geometry shader (along with clipping/culling processes) to generate vertex data for the final sub-primitives. As will be appreciated, there are a number of different shader stages in the geometry processing phase. The approaches described herein allow the duplication of particular shader stages to be skipped. There are therefore different shader stages from which the shader stage output data stored in memory could be taken. In this way, it is possible to select which stages of the geometry processing stage are to be skipped during the rasterisation phase. In particular, four examples will be illustrated with reference to FIGS. 8 to 11 that illustrate different modes of operation in which different stages of the geometry processing are skipped. When the sub-primitives have been derived, they are rendered by performing hidden surface removal and texturing/shading in step S718 (similar to step S518), and the rendering output is stored in step S720 (similar to step S520).

Figure 8:
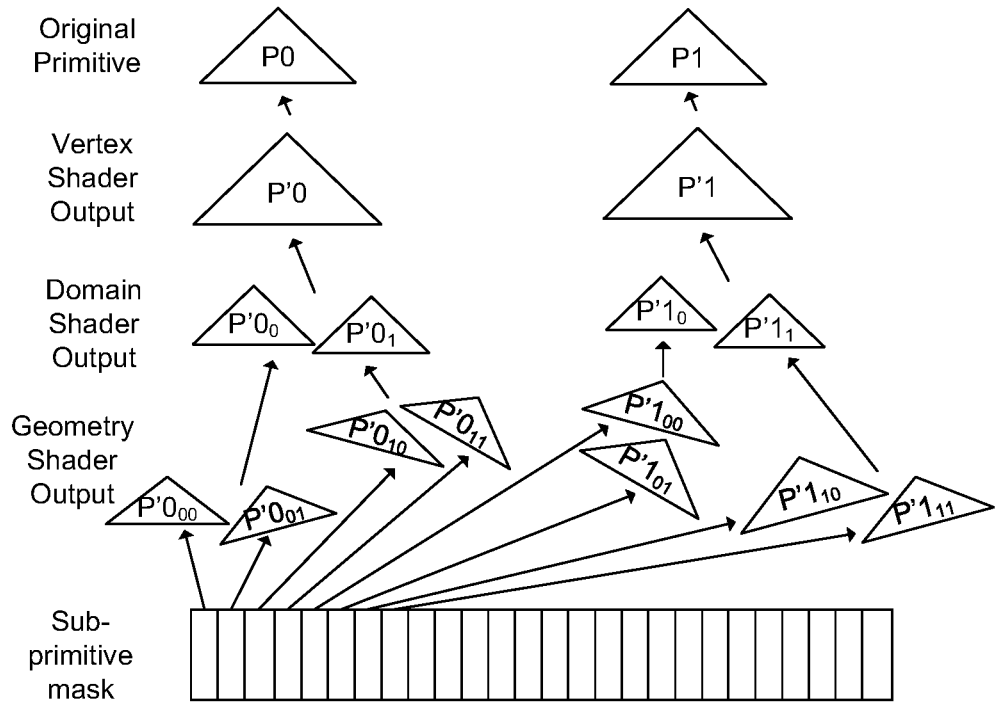
FIG. 8 illustrates the relationship of vertex data for primitives at different stages of geometry processing.

FIG. 8 illustrates a hierarchy of primitives generated during the geometry processing phase. For example, the application being run by the graphics processing system may provide original primitive PO having vertex data. An invocation of a vertex shader may process the vertex data of primitive P0 to generate vertex shaded vertex data that represents a processed primitive P'0. The shaded vertex data output from the vertex shader may form at least part of shader output data stored in memory 424. The vertex data output from the vertex shader may be input into a hull and domain shader (and also a fixed function tessellation block) which then performs tessellation to generate a plurality of shaded geometry data representing transformed primitives. For example, the domain shader may output vertex data for one or more sub-primitives P'$0_0$, P'$0_1$. The sub-primitives output from the domain shader may be fed into an invocation of a geometry shader which may generate one or more sub-primitives, e.g. the sub-primitives P'$0_{00}$ and P'$0_{01}$ may be generated when a geometry shader invocation processes sub-primitive P'$0_0$. A sub-primitive mask stored for each tile contains a reference to a particular final sub-primitive that is to be used in rendering. The sub-primitive indications stored in memory are structured (such as using pointers or header information) to identify for a sub-primitive identified by the sub-primitive mask the shader stage output data from which that sub-primitive derives and the shader stages used to derive the sub-primitive. For example, the vertex data output from a vertex shader is stored in memory along with data that indicates the corresponding hull shader, domain shader, geometry shader and cull/clip process invocations for producing the resultant transformed sub-primitive to be used in rendering.

Figures 9A, 9B:
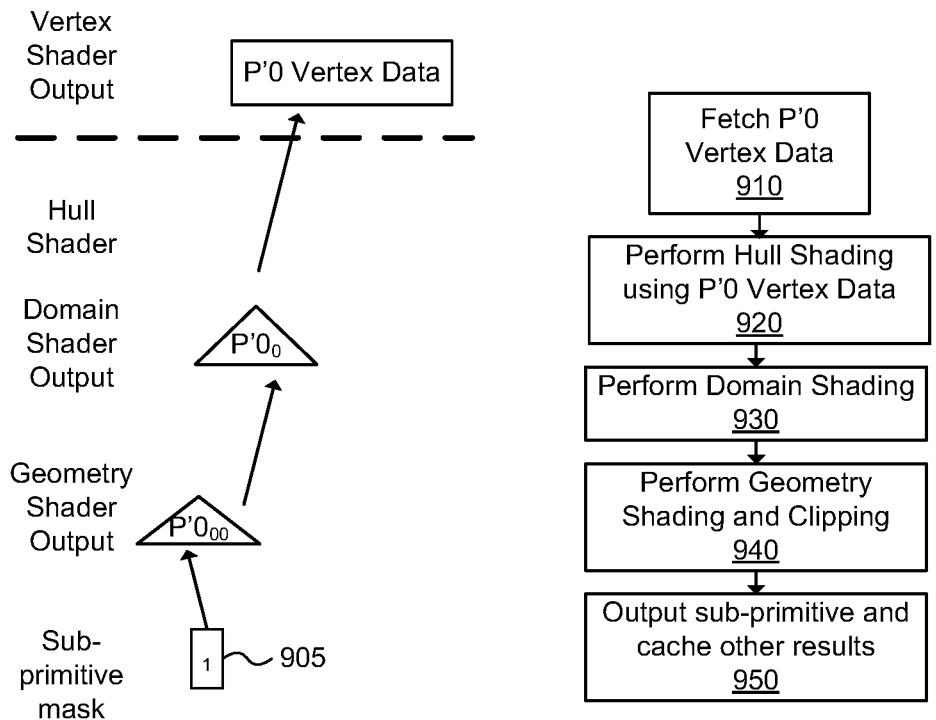
FIG. 9(A) and FIG. 9(B) illustrate a first example approach for generating a sub-primitive based on stored shader stage output data.

FIGS. 9(*a*) and (*b*) illustrate an arrangement in which the shader stage output data comprises vertex data output from the vertex shader. In this arrangement, the vertex data from each vertex shader invocation is stored in the shader output memory 424. During the rasterisation phase, it is possible to skip the processing performed by the vertex shader. As shown in FIG. 9(*a*), the vertex shader output data comprises the vertex data for vertex shaded primitive P'0 which is stored in memory (indicated by the dashed line). The sub-primitive mask 905 for a particular tile identifies which final sub-primitives are at least partially located in that tile, including sub-primitive P'$0_{00}$, through indication data that provides a sequence of pointers that identify a chain of different shader invocations. For example, the sub-primitive mask may identify sub-primitive P'$0_{00}$ as being at least partially in the tile. The sub-primitive P'$0_{00}$ may have been generated by a particular geometry shader invocation which received input data from a domain shader invocation that outputted sub-primitive P'$0_0$. Accordingly, the sub-primitive indication data indicates from which domain shader invocation the sub-primitive P'$0_{00}$ is derived. Sub-primitive indication data is present in the control stream data stored in memory and identifies a chain of shader stage invocations that, during the tiling stage, resulted in the generation of sub-primitive P'$0_{00}$ up to the original vertex data stored in shader output memory 424. Accordingly, during the rasterisation phase, the shader output data stored in memory 424 (including P'0 vertex data) can be read and the shader invocations identified in the chain can be re-performed using the shader output data as an input.

FIG. 9(*b*) illustrates in more detail the processing steps that are performed during the rasterisation phase to generate the vertex data for a sub-primitive to be used in rendering the tile based on the identification of that sub-primitive in a sub-primitive mask. At the beginning of this process, a particular sub-primitive (e.g. sub-primitive P'$0_{00}$) has been identified in the sub-primitive indications. Based on the sub-primitive indication data, an association between sub-primitive P'$0_{00}$ and P'0 vertex data stored in shader output memory 424 is established. From that, at step 910 the vertex data P'0 is retrieved from the shader output memory. In addition, any other stored data (e.g. side data or output data from other vertex shader invocations) required to re-generate the sub-primitive is retrieved. At step 920, hull shading is performed using P'0 vertex data to generate the tessellation factors for the patch needed by the domain shader, as well as any other side data required by the domain shader. At step 930, the data generated by the invocation of the hull shader at step 920 and the vertex data retrieved from memory is processed by the domain shader to generate a set of tessellated sub-primitives (including, for example, P'$0_0$). The tessellated sub-primitives are passed to one or more geometry shader invocations at step 940 that generate the final sub-primitive that is to be used in rendering the tile. The final sub-primitive P'$0_{00}$ is then output for rendering at step 950.

At step 950, data generated as a result of performing steps 910 to 950 are stored in the cache system 434. Optionally, the shader stage output data retrieved from memory 424 may also be stored in the cache system. When the process of FIG. 9(*b*) is repeated for other sub-primitives identified in the sub-primitive mask, one or more of the steps in FIG. 9(*b*) can be skipped if the shader stage output data stored in memory 424 (or for a different shader invocation) is in the cache. Instead, the relevant data can be retrieved from the cache. In the event that the vertex data for the next final sub-primitive ($P'0_{01}$) is present in the cache (e.g. because it resulted from a geometry shader invocation previously performed in the rasterisation phase), then geometry processing steps can be skipped and the sub-primitive can be output for rendering (e.g. by the HSR unit). Similarly, if the shader stage output for a particular invocation of a domain shader (for example, including tessellated sub-primitives, such as $P'0_0$) is stored in the cache, a subsequent sub-primitive that is to be generated and was derived from that domain shader invocation can be utilised to generate the subsequent sub-primitive thus allowing subsequent processing to be performed whilst avoiding unnecessary reading from memory or additional geometry processing.

FIG. 10 illustrates another example, in which the hull shader and vertex shader outputs are stored in memory (as illustrated by the dashed line) which allows the vertex shader and hull shader to be skipped when performing geometry processing during the rasterisation phase. For a particular sub-primitive $P'0_{00}$ identified in a sub-primitive mask, the sub-primitive indication data identifies the invoked shader stages between the hull shader output and the geometry shader output. Accordingly, fewer links between shader stages need to be stored relative to the arrangement of FIG. 9. However, more shader stage output data needs to be stored for the arrangement of FIG. 10. In addition to the P'0 vertex data that is stored for the arrangement of FIG. 9, tessellation factors that are generated by the hull shader for the patch are also stored in memory 424. During the geometry phase, once a sub-primitive has been identified by the sub-primitive indications (e.g. in a sub-primitive mask), fewer geometry processing shader stages need to be executed to generate a sub-primitive mask. As illustrated in FIG. 10(b), it is not necessary to perform hull shading to generate a sub-primitive. Instead, the generation of a sub-primitive begins with the fetching of the vertex data and tessellation factors (step 1010) from memory 424 and domain shading (step 1030), geometry shading and optionally culling/clipping (step 1040) to generate the sub-primitive, and then outputting the sub-primitive along with the caching of results (step 1050). As will also be appreciated, since the number of shader stages performed in the arrangement of FIG. 10 is fewer than those performed in the arrangement of FIG. 9, the number of different shader stages for which outputs need to be cached is also fewer. Put another way, it is also not necessary to cache the hull shader outputs. Thus, the cache of the arrangement of FIG. 10 is simpler than the cache of the arrangement of FIG. 9. The other shader stage outputs generated during the operation of FIG. 10(b) can be cached for use when processing a subsequent sub-primitive.

Another example is illustrated in FIG. 11, in which the data stored in memory 424 is derived from a shader stage at a later stage in the geometry processing pipeline than that stored in the examples shown in FIGS. 9 and 10. In particular, in the arrangement of FIG. 11, the output of the domain shader is stored in memory 424 (as illustrated by the dashed line). Accordingly, where sub-primitive indications (e.g. a sub-primitive mask) identifies a sub-primitive that is to be used in rendering a particular tile, the sub-primitive indication data indicates the shader invocations used to generate the sub-primitive ($P'0_{00}$). In this instance it is only necessary to be able to identify the geometry shader invocation that generated that sub-primitive as well as the domain shader output that was used as an input to that geometry shader invocation. The domain shader output stored in memory 424 in this arrangement is the vertex data of the tessellated primitives generated by the domain shader invocation. The approach of FIG. 11 therefore requires less sub-primitive indication data to be stored, since fewer shader stages link the shader output data stored in memory with the final sub-primitive to be used in rendering the tile. However, as will be appreciated the tessellation process may involve a large expansion in the amount of geometry for which data needs to be stored. Therefore, in the arrangement of FIG. 11 a significantly greater amount of vertex data may be stored (possibly in the order of 1000s more vertices) when compared with the arrangements of the examples shown in FIGS. 9 and 10. However, as a trade-off the geometry processing during the rasterisation phase and the caching is greatly simplified when compared with the examples shown in FIGS. 9 and 10 as will be explained below.

FIG. 11(b) illustrates the steps to be taken once a sub-primitive has been identified in the sub-primitive indication data (e.g. in the sub-primitive mask) for generation. At step 1110, the vertex data for tessellated primitive $P'0_0$ is retrieved from memory 424 and at step 1140 geometry shading (and optionally clipping and culling) is performed on the retrieved vertex data to generate the final sub-primitive to be used in rendering the tile. Relative to the arrangements shown in FIGS. 9 and 10, there are fewer geometry processing steps (i.e. fewer shader stages) that need to be performed during the rasterisation phase. In particular, vertex shading, hull shading and domain shading (as well as the fixed-function tessellation process) do not need to be performed during rasterisation. Similarly, shader stage output data generated as a result of the geometry shading and clipping/culling is cached. In contrast, vertex shader outputs, hull shader outputs, and domain shader outputs do not need to be cached. Accordingly, fewer types of shader stage output data need to be provided in the cache, relative to the arrangements shown in FIGS. 9 and 10. Similarly, another arrangement may involve the storage in memory 424 of the outputs of the geometry shaders such that clipping/culling is the only geometry processing required in the rasterisation phase.

As will be appreciated, the arrangements set out above in relation to FIGS. 8 to 11 provide the flexibility for the designer of the graphics processing system to select the particular shader stage (or stages) which are to be skipped during the rasterisation phase and thus for which the shader output data is to be stored in memory when transitioning between tiling and rasterisation phases. As will be appreciated, there are trade-offs to made in the graphics processing system when determining which shader stage output to store in memory. By storing shader stage output data to memory for an earlier shader stage, fewer elements of data are stored to memory but more caching and more geometry processing is required in the geometry phase when compared with an approach that stores output data from a later shader stage.

In some arrangements, it may be possible for a graphics processing system to have the capability to operate in a number of different modes and to switch between the different modes during operation, depending on a control signal (or a provided flag). For example, the graphics processing system could be configured to operate in a mode in accordance with the arrangement of FIG. 1 in which all transformed parameters are stored in memory (124). Another mode may involve the graphics processing module being configured to operate according to FIG. 2, in which no transformed data is stored between tiling and rasterisation phases—referred to as a "UDL" mode or an untransformed display list mode. The arrangements of FIGS. 9 to 11 may each represent a different mode that the graphics processing system can be configured to operate using.

Where the graphics processing system is configured to operate in a number of different modes, the graphics processing system could be configured to switch between modes in a number of different ways. For example, the graphics processing system could be configured to switch between modes on a render-by-render basis, such that a complete image of a 3-D scene is rendered based on a set of geometry in one mode. For the geometry data for a subsequent image to be rendered, the operating mode to be used by the graphics processing system could be (re-)defined. For example, the geometry data for the subsequent render could be defined by the application and an indication of the mode could be provided in the graphics memory. In an alternative, the mode of operation of the graphics processing system could be configured to change on a patch-by-patch basis such that the geometry for a particular patch is processed in accordance with a particular mode of operation. In this way, a large complex patch that appears in a number of different tiles may benefit from storage in memory between the geometry processing and rasterisation phases—since caching and geometry processing of the patch could improve processing throughput. In contrast, for geometry that is not tessellated or for geometry that is relatively simple it may prove more efficient to simply process the geometry using the arrangement as illustrated in FIG. 1.

In some arrangements, the graphics processing system may be configured to implement only two different modes. For example, a first mode that is to be used for input geometry that is not tessellated might involve the operation as illustrated in FIG. 1 or FIG. 2. A second mode implemented by the graphics processing system may be to operate according to one of the arrangements selected from those shown in FIGS. 9 to 11.

The use of the cache system 434 is described below with reference to FIGS. 12 and 13. The cache system 434 comprises a cache 436 and a cache controller 438. The cache controller 438 may be implemented in hardware, software or a combination thereof. The cache 436 is configured to store shader stage output data which are output from the transform and sub-primitive derivation logic 430. The cache stores the shader stage output data as a hierarchy of shader stage output data with different levels of the hierarchy representing different processing stages of a sequence of geometry processing stages used to derive sub-primitives from the shader stage output data stored in the memory 424. For example, as described above, FIG. 6 shows sequences of processing stages which can be performed to derive sub-primitives. The fetched shader stage output data and the results of the different shader stages, including the final derived sub-primitives, are stored in the cache at appropriate levels within the hierarchical cache structure. For example, the clipper generated primitives 620 (which may be in the form of triangle fans) may be considered to be at level 0 of the hierarchy; the GS generated primitives 616 may be considered to be at level 1 of the hierarchy; the tessellation generated primitives 612 may be considered to be at level 2 of the hierarchy; the patch output data 605 in conjunction with the vertex UV coordinates 609 may be considered to be at level 3 of the hierarchy; and the patch input control points 604 may be considered to be at level 4 of the hierarchy. In some other examples, to save space in the cache 436, since the clipping is a relatively inexpensive computation, the clipper output might not be stored in the cache 436, and the clipper can be re-executed when it is needed.

In the examples described herein, reference is made to storing "sub-primitives" in the cache 436. In some examples, primitives (including "sub-primitives") may be stored as discrete items in the cache 436. However, it will be apparent to those skilled in the art that primitives (including "sub-primitives") may be described by multiple graphics data items, e.g. multiple vertices, such that in order to store a primitive, in some examples a plurality of graphics data items (e.g. vertices) may be stored in the cache 436, such that "storing a primitive (or sub-primitive) in the cache" may actually involve storing multiple graphics data items in the cache 436. Furthermore, different primitives may share one or more vertices, such that the cache 436 may store some but not all of the vertices of a primitive.

Figure 12:
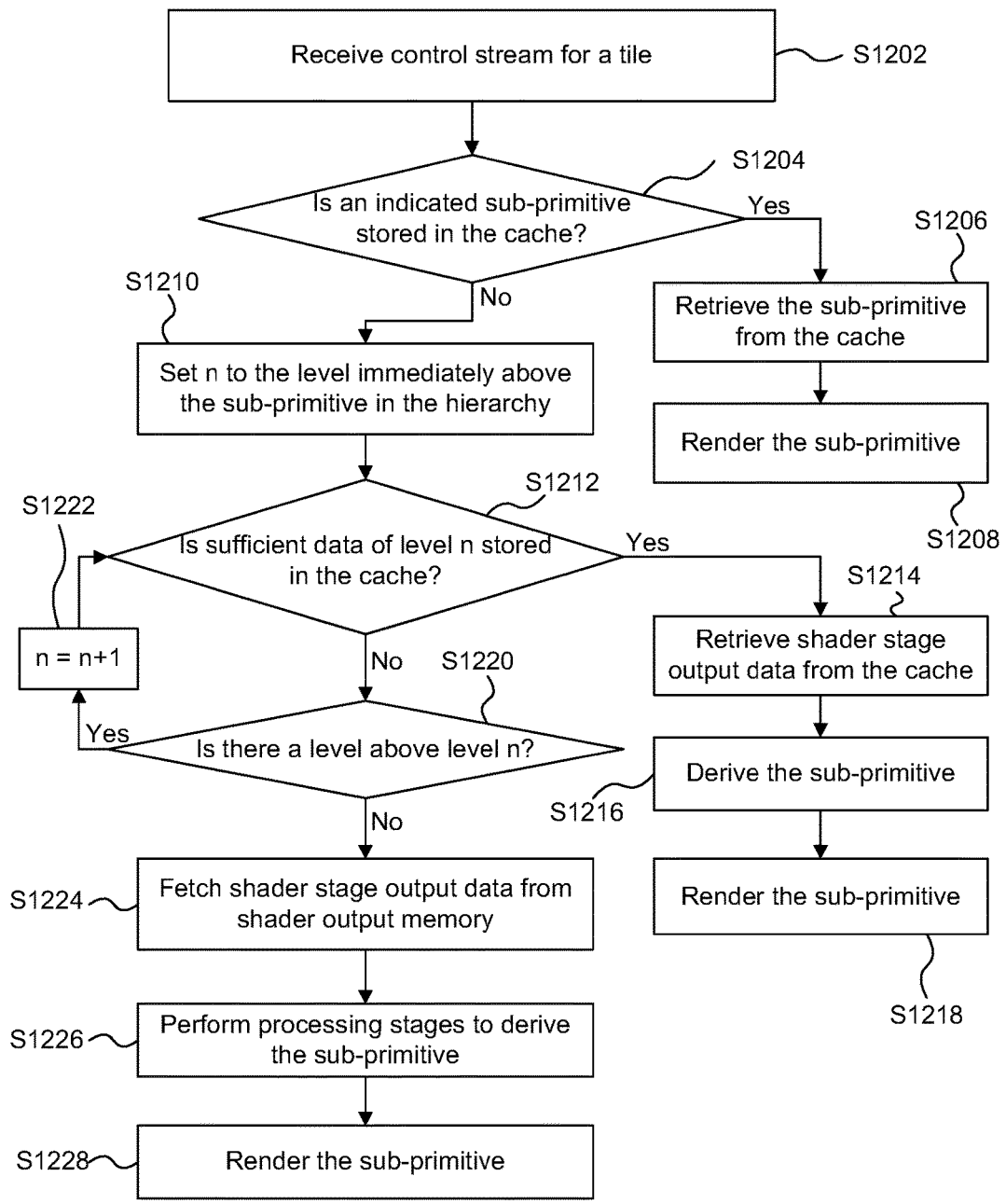
FIG. 12 is a flow chart showing a method of generating a rendering output in a graphics processing system according to FIG. 4.

The flow chart shown in FIG. 12 illustrates a method of using the cache 436 in the rasterisation phase. In step S1202 the control stream data for a tile is received at the fetch unit 416. As described above, the control stream data for a tile includes sub-primitive indications which indicate sub-primitives which are to be used for rendering a tile and indicate the shader stage output data and shader stage invocations required to generate the sub-primitives in that tile. For a sub-primitive that is indicated in the control stream data for a tile, the fetch unit 416 can poll the cache system 434 to determine whether the sub-primitive is stored in the cache 436 or whether the sub-primitive will need to be derived. For example, the sub-primitive which is being requested may be the primitive $616_{400}$ as shown in FIG. 6.

In response to a request from the fetch unit 416 for a sub-primitive, the cache controller 438 determines, in step S1204, whether the sub-primitive is stored in the cache 436. The sub-primitive is composed of one or multiple graphics data items, which may be generated by different operations. For instance, a tessellation-generated triangle is composed of three graphics data items (e.g. vertices in this case), which are the output of three domain shader invocations. A sub-primitive is stored in the cache 436 by storing all of the graphics data-items (e.g. all of the vertices) for that sub-primitive in the cache 436. If the sub-primitive is stored in the cache 436 then, in step S1206, the sub-primitive is retrieved from the cache 436. The retrieved sub-primitive can bypass the transform and sub-primitive derivation logic 430, and be provided to the processing units (i.e. to the HSR unit 418 and the texturing/shading unit 420 in the example shown in FIG. 4) for rendering in step S1208. As described in more detail below, it may be the case that some but not all of the graphics data items (e.g. vertices) for a sub-primitive are stored in the cache 436; and if this is the case then the graphics data items for the sub-primitive that are stored in the cache can be retrieved from the cache 436, and the graphics data items for the sub-primitive that are not stored in the cache can be derived. In this way all of the graphics data items for the sub-primitive can be provided to the processing units (i.e. to the HSR unit 418 and the texturing/shading unit 420 in the example shown in FIG. 4) for rendering in step S1208, S1218 or S1228. The derived graphics data items for the sub-primitive may be stored in the cache 436 for later use.

However, if in step S1204 the cache controller 438 determines that the sub-primitive is not stored in the cache 436 (i.e., one or more of the graphics data items for the sub-primitive is not stored in the cache 436) then the method passes from step S1204 to step S1210. In step S1210 the cache controller 438 sets a variable n to a value indicating the level immediately above the sub-primitive in the hierarchy. For example, as described above, the primitives 616 shown in FIG. 6 may represent level 1 of the hierarchy, so the level immediately above this level is level 2. Therefore, in step S1210 n is set to a value of 2 in this example.

In step S1212 the cache controller 438 determines whether one or more graphics data items of the higher level (i.e. level 2) of the hierarchy are stored in the cache 436, wherein the sub-primitive would be derivable from said one or more graphics data items of the higher level. That is, the cache controller 438 determines whether there are sufficient graphics data items of level n stored in the cache 436 in order to derive the sub-primitive. In the example in which the sub-primitive to be derived is primitive $616_{A00}$ as shown in FIG. 6, step S1212 involves determining whether the primitive $612_{A0}$ is stored in the cache 436 because the primitive $616_{A00}$ can be derived from the primitive $612_{A0}$ by executing the GS instance $614_{A00}$.

If it is determined in step S1212 that there are sufficient graphics data items at level n stored in the cache 436 then the method passes to step S1214 in which the cache controller 438 retrieves, from the cache 436, the one or more graphics data items of level n of the hierarchy which are to be used to derive the sub-primitive. For example, the cache controller 438 may retrieve the primitive $612_{A0}$ from the cache 436. The retrieved graphics data items are provided to the transform logic 430 and/or the transform and sub-primitive derivation logic 430 for use in deriving the sub-primitive to be rendered.

In step S1216 the transform and sub-primitive derivation logic 430 derives the sub-primitive using the retrieved graphics data items. For example, the transform and sub-primitive derivation logic 430 may derive the sub-primitive $616_{A00}$ using the retrieved primitive $612_{A0}$ by executing the GS instance $614_{A00}$. At any stage in the hierarchy, only the computations required for deriving the sub-primitives are performed. For instance, three Domain Shader (DS) instances ($610_{A0}$, $610_{A1}$ and $610_{A2}$) provide the inputs of the Geometry Shader (GS) instance $614_{A00}$. Therefore if we want to execute the GS instance $614_{00}$ and if the output of the DS instance $610_{A0}$ is not stored the cache but the output of the DS instances $610_{A1}$ and $610_{A2}$ can be read from the cache, then the DS instance $610_{A0}$ is executed but the DS instances $610_{A1}$ and $610_{A2}$ are not executed. The derived sub-primitive (e.g. $616_{A00}$) is then rendered in step S618, as described above, by the HSR unit 418 and the texturing/shading unit 420.

If it is determined in step S1212 that there are not sufficient graphics data items in the cache 436 at level n of the hierarchy (i.e. if it is determined that any of the one or more graphics data items of the higher level of the hierarchy which are used to derive the sub-primitive are not stored in the cache) then the method passes to step S1220 in which the cache controller 438 determines whether there is another level in the hierarchy above level n. In the example shown in FIG. 6 there are six levels of the hierarchy (levels 0 to 5), so there is a level above level 2. Therefore, the method passes from step S1220 to step S1222 in which the value of n is incremented, and then the method passes back to step S1212.

On this iteration, in step S1212, the cache controller 438 determines whether one or more further graphics data items of level 3 are stored in the cache which can be used to derive the sub-primitive. If they are then steps S1214 to S1218 are performed to retrieve those further graphics data items from the cache 436, to perform the necessary processing stages on the retrieved graphics data items to derive the sub-primitive, and to render the derived sub-primitive. In the example shown in FIG. 6, steps S1212 to S1218 on this iteration may comprise determining whether the patch output data $605_A$ in conjunction with the vertex UV coordinates $609_A$ are stored in the cache 436. If they are then the patch output data $605_A$ in conjunction with the vertex UV coordinates $609_A$ are retrieved from the cache and the domain shader instances $610_{A0}$, $610_{A1}$ and $610_{A2}$ are executed by the transform and sub-primitive derivation logic 430 to produce the tessellated primitive $612_{A0}$ and then the geometry shader instance $614_{A00}$ is executed by the transform and sub-primitive derivation logic 430 to derive the sub-primitive $616_{A00}$. It is noted that the sub-primitive indications in the control stream indicate which processes are needed to derive the sub-primitive $616_{A00}$ from the patch output data $605_A$ in conjunction with the vertex UV coordinates $609_A$, such that the transform and sub-primitive derivation logic 430 can determine that it does not need to perform other, unnecessary processing steps, such as executing domain shader instance $610_{A3}$ or geometry shader instance $614_{A01}$. The derived sub-primitive (e.g. $616_{A00}$) is then rendered as usual in step S1218 by the HSR unit 318 and the texturing/shading unit 420.

The iterations of steps S1212 to S1222 continue until n is set to a value such that in step S1220 it is determined that there is not a level in the hierarchy above level n. Therefore at this point the cache controller 438 determines in step S1220 that the sub-primitive cannot be derived from graphics data items stored in the cache. The method then passes from step S1220 to step S1224.

In step S1224 the fetch unit 416 fetches shader stage output data from the shader output memory 424 for deriving the sub-primitive. The method proceeds as described above, such that in step S1226 the transform and sub-primitive derivation logic 430 performs processing on the fetched shader stage output data to derive the sub-primitive, and in step S1228 the sub-primitive is rendered as described above by the HSR unit 418 and the texturing/shading unit 420. In step S1226, as in step S1216, only the required operations are performed at any stage of the hierarchy.

As an example, with reference to FIG. 6, the output of the vertex shaders $602_2$ and $602_3$ might already been in the cache 436 even if patch A $604_A$ has never been processed during the rasterisation phase, since they also belong to patch B $604_B$. The same principle applies to the domain shader outputs for $610_{A1}$ and $610_{A2}$, since they belong to both primitives $612_{A0}$ and $612_{A1}$. Cache hits are more likely when a primitive or patch covers many adjacent tiles.

The method shown in FIG. 12 allows sub-primitives to be derived from the information stored in the cache 436 in an efficient manner. In particular, the lowest level data from the cache that can be used to derive a sub-primitive is retrieved from the cache and used to derive the sub-primitive. In order to populate the cache 436, graphics data items may be stored in the cache when they are either fetched or derived at the rasterisation logic 406. For example, the shader stage output data fetched from the shader output memory 424 by the fetch unit 416 are stored in the cache 436. Furthermore, subsequent graphics data items (e.g. control points 604 and vertex UV coordinates 6609 shown in FIG. 6 or primitives such as 612, 616 and 620 shown in FIG. 6) representing the results of performing one or more processing stages for deriving a sub-primitive (including the final sub-primitives themselves) may be stored in the cache 436 when they have been derived in the rasterisation logic 406. The same graphics data items may be used for deriving different sub-primitives. For example, the primitive $612_{A0}$ shown in FIG. 6 can be used for deriving the four primitives $616_{A0}$, $616_{A01}$, $616_{A02}$ and $620_{A010}$. Therefore, once the primitive $612_{A0}$ has been derived for determining one of those four primitives, it can be retrieved from the cache 436 for deriving the other three of those four primitives. Also, some primitives may be at least partially within more than one tile, so if they have been derived for rendering one tile, they may still be stored in the cache when another tile is rendered, and as such can be retrieved from the cache rather than deriving them from the input graphics data items again.

Figure 13:
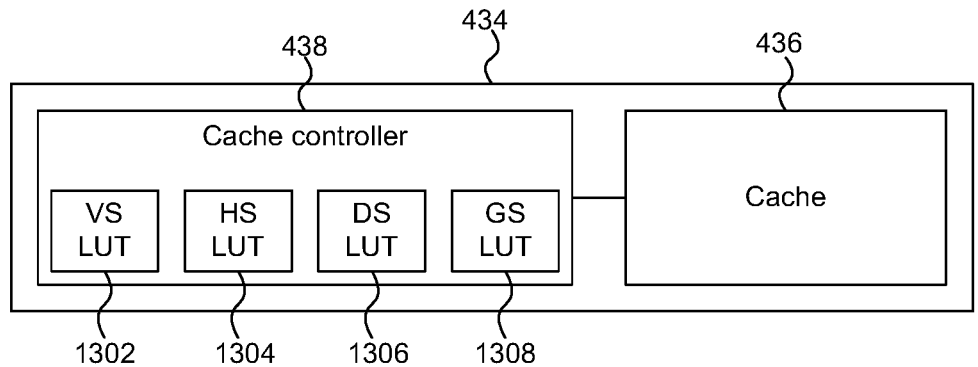
FIG. 13 is a diagram showing a cache system.

FIG. 13 shows the cache system 434 including the cache 436 and the cache controller 438. The cache controller 438 includes one or more lookup tables which are maintained to indicate the current contents of the cache 436. The lookup tables contain information about the different stages of the graphics pipeline and may or may not be implemented in the same hardware structure as each other. If the hardware structure is shared, it is partitioned by the graphics system at the start of each rendering pass to contain information about the graphics pipeline stages in use. The cache controller 438 can determine whether graphics data items (e.g. primitives or control points) are stored in the cache 436 by querying the lookup table(s). For example, the cache controller 438 may store a lookup table for each stage of the processing sequence. In the example shown in FIG. 12 the cache controller 438 includes four lookup tables: a vertex shader lookup table 1302 which indicates if (and if so, where) the results of respective vertex shader invocations are stored in the cache 436; a hull shader lookup table 1304 which indicates if (and if so, where) the results of respective hull shader invocations are stored in the cache 436; a domain shader lookup table 1306 which indicates if (and if so, where) the results of respective domain shader invocations are stored in the cache 436; and a geometry shader lookup table 1308 which indicates if (and if so, where) the results of respective geometry shader invocations are stored in the cache 436. The lookup tables allow searching for the result of a univocally identified execution. For example, given the draw call number, the instance identifier and the index of a vertex, a vertex shader invocation is univocally identified. Similar concepts apply to the other shader stages, with the entries in the cache 436 from different shaders being identified by a different set of values, which can generally be referred to as "tags". The amount of output produced by each shader stage can vary, and the cache 436 may allocate different maximum sizes to the outputs from the different stages. The lookup tables may be implemented as fully-associative or set-associative.

The cache 436 may be referred to as a buffer. The cache 436 may comprise a single memory pool for storage of data from all of the levels of the hierarchy, e.g. the different types of graphics data items shown in FIGS. 6 (604, 609, 612, 616 and 620) may all be stored in the same memory pool in the cache 436. This may allow flexibility in what data can be stored in the cache 436. In other examples, the cache 436 may comprise a plurality of memory pools, wherein different ones of the memory pools are configured to store data from different levels of the hierarchy. For example, a first memory pool of the cache 436 may be configured to store the shader stage output data fetched from the shader output memory 424, a second memory pool of the cache 436 may be configured to store patch input control points (e.g. 604), a third memory pool of the cache 436 may be configured to store patch output data (e.g. 605) in conjunction with vertex UV coordinates (e.g. 609), a fourth memory pool of the cache 436 may be configured to store the outputs of domain shaders (e.g. 612), a fifth memory pool of the cache 436 may be configured to store the outputs of geometry shaders (e.g. 616), and a sixth memory pool of the cache 436 may be configured to store the outputs of clippers (e.g. 620). Using different memory pools for different types of data allows data to be flushed or evicted from the cache 436 depending on the type of the data independently, and it also stops the cache 436 becoming dominated by one type of data, e.g. it stops frequently executed shader stages (such as the domain shader) evicting data from the cache 436 for less frequently executed, but potentially computationally expensive, stages (such as the hull shader).

The cache 436 has a finite size which is typically not large enough to simultaneously store all of the graphics data items which are used during the rendering of an image. Therefore, at some point data items may need to be evicted from the cache to allow other data items to be stored in the cache. The cache controller 438 uses a replacement policy to determine which data items are to be evicted. In some examples, the replacement policy is such that data items which are more likely to be used again are less likely to be evicted from the cache 436.

The tiling unit 414 of the geometry processing logic 404 may determine the number of tiles that each graphics data item covers (i.e. overlaps), and can set a respective priority for each graphics data item based on the number of tiles covered by that graphics data item. The priorities can be included in the control stream data (or passed to the rasterisation logic 406 as other sideband information), such that the rasterisation logic 406 can retrieve the priorities. The cache controller 438 can then evict graphics data items from the cache 436 based on the priorities of the graphics data items, e.g. by choosing to evict one or more data items with low priorities. When a tile has been rendered, the priorities of the graphics data items in the cache 436 which were used during the rendering of the tile can be decremented, such that the priorities reflect the number of tiles which are still to be rendered for which the respective graphics data items are to be used.

The priorities are preferably determined hierarchically, such that higher level data items from the hierarchy tend to have higher priorities because they tend to cover a larger number of tiles than lower level data items. For example, a tessellated primitive might only cover one tile but the patch of which the tessellated primitive is a part might cover several tiles. As another example, the priorities associated with the geometry shader outputs (e.g. primitives 616 shown in FIG. 6) tend to be lower than the priorities associated with the domain shader outputs (e.g. primitives 612 shown in FIG. 6), which in turn tend to be lower than the priorities associated with the hull shader outputs (e.g. patch output data 605 and vertex UV coordinates 609 shown in FIG. 6) and so on up the hierarchy.

In some examples, a graphics data item containing vertices produced by the last stage of the pipeline is kept resident in the cache 436 until the HSR and shading units (418 and 420) have processed all the primitives that depend on it. For instance, a GS output may contain several primitives and a DS output may be shared by several tessellation generated primitives that cover one or multiple tiles. The primitives may cover one or multiple tiles. Once a hit in the cache 436 occurs for a graphics data item, the graphics data item is retained in the cache 436 until processing of the primitives relating to the graphics data item is completed by the HSR and shading units 418 and 420. Therefore, a strategy is used for preventing the replacement policy of the lookup tables and the cache from evicting the graphics data items which are to be used by HSR and shading. Two examples of different strategies are described here: locking and reference counting.

In the locking scheme, for each set of one or more graphics data items, one lock bit is stored for each tile being simultaneously processed by the graphics system. These lock bits can be grouped to form a lock mask for the set of one or more graphics data items. Each primitive processing unit down the graphics pipeline of the rasterisation logic 406 (e.g. the HSR unit 418 and the texturing/shading unit 420) is configured to operate in accordance with the lock mask. The lock bit for a tile within the mask for a set of one or more graphics data items is set when the graphics data item is sent for processing by the first processing unit in the pipeline (e.g. the HSR unit 418) and cleared when the primitive processing units in the pipeline (e.g. both the HSR unit 418 and the texturing/shading unit 420) have completed processing a batch of primitives corresponding to the one or more graphics data items in the set. If the lock bit is set for a set of one or more graphics data items, the set of graphics data item(s) cannot be safely evicted from the cache 436 and look-up tables 1202-1208, so eviction is prevented. However, if the lock bit for a set of one or more graphics data items is not set, the set of graphics data item(s) can be safely evicted from the cache 436 and look-up tables 1302-1308.

In the reference counting scheme, a reference count is maintained for each of a plurality of sets of one or more graphics data items. Each of the sets may for example include a single graphics data item or a plurality of graphics data items which are contiguously allocated in the cache 436. A reference count indicates the number of sub-primitives currently being processed in the pipeline which are descendants (in the hierarchy) of a graphics data item of the respective set of one or more graphics data items. The reference counts for all the graphics data items required to generate a sub-primitive are incremented when the sub-primitive is sent down the graphics pipeline for further processing and decremented after the sub-primitive has been processed by the full graphics pipeline in the rasterisation phase. If the reference count for a set of one or more graphics data items is zero, the graphics data item(s) in the set can be safely evicted from the cache 436 and look-up tables 1202-1208.

In the arrangements described above, shader stage output data is stored in the shader output memory 424. As illustrated in some examples, data from more than one shader stage is stored in memory at the same time (see, for example, FIG. 10). The reason for this is that vertex data generated at a shader stage is used to perform geometry processing. For example, tessellation factors and/or UV coordinates are by themselves insufficient to re-generate the sub-primitives. Accordingly, in some examples sub-primitives from more than one stage may be stored in shader output memory 424.

It will be appreciated that the approaches described herein in relation to FIG. 4, utilise a cache to reduce the memory read usage during the rasterisation phase. In some implementations it is not necessary to implement the cache and instead data could be read from memory for each tile without caching—depending on the constraints of the graphics processing system.

Figure 14:
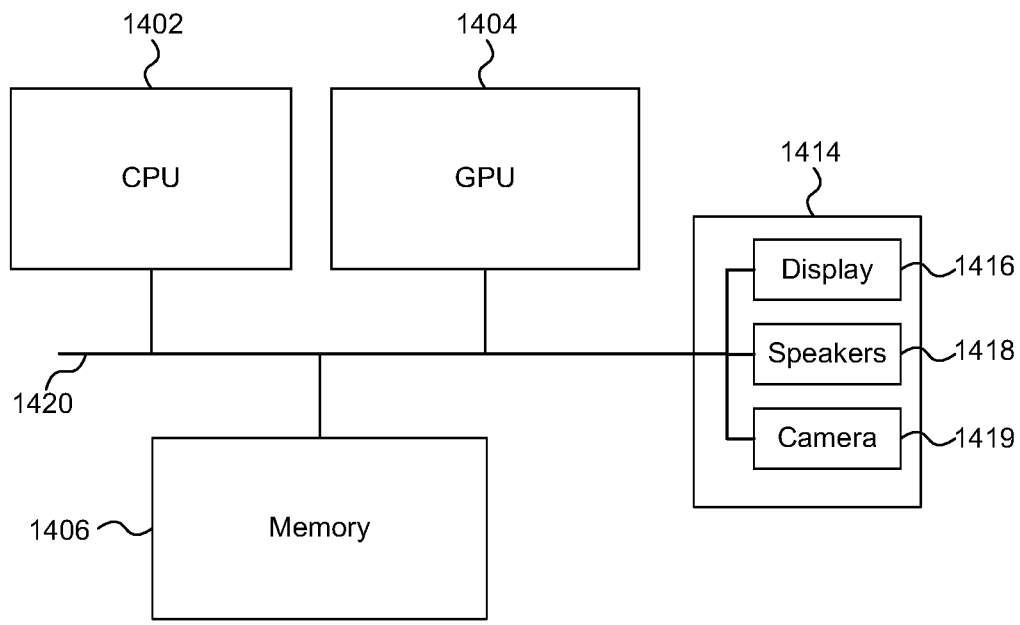
FIG. 14 shows a graphics processing system according to further alternative embodiments.

FIG. 14 shows a computer system in which the graphics processing systems described herein may be implemented. The computer system comprises a CPU 1402, a GPU 1404, a memory 1406 and other devices 1414, such as a display 1416, speakers 1418 and a camera 1419. The components of the computer system can communicate with each other via a communications bus 1420. A store 1412 is implemented as part of the memory 1406.

The graphics processing system of FIGS. 4 to 13 are shown as comprising a number of functional blocks. This is schematic only and is not intended to define a strict division between different logic elements of such entities. Each functional block may be provided in any suitable manner. It is to be understood that intermediate values described herein as being formed by a graphics processing system need not be physically generated by the graphics processing system at any point and may merely represent logical values which conveniently describe the processing performed by the graphics processing system between its input and output.

The graphics processing systems described herein may be embodied in hardware on an integrated circuit. The graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 15.

Figure 15:
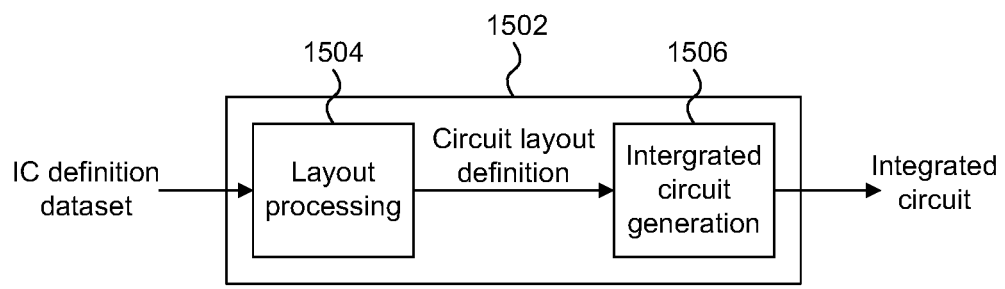
FIG. 15 shows a computer system in which a graphics processing system is implemented.

FIG. 15 shows an example of an integrated circuit (IC) manufacturing system 1502 which is configured to manufacture a graphics processing system as described in any of the examples herein. In particular, the IC manufacturing system 1002 comprises a layout processing system 1504 and an integrated circuit generation system 1506. The IC manufacturing system 1502 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 1502 to manufacture an integrated circuit embodying a graphics processing system as described in any of the examples herein.

The layout processing system 1504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1504 has determined the circuit layout it may output a circuit layout definition to the IC generation system 1506. A circuit layout definition may be, for example, a circuit layout description.

The IC generation system 1506 generates an IC according to the circuit layout definition, as is known in the art. For example, the IC generation system 1506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1506 may be in the form of computer-readable code which the IC generation system 1506 can use to form a suitable mask for use in generating an IC.

The different processes performed by the IC manufacturing system 1502 may be implemented all in one location, e.g. by one party. Alternatively, the IC manufacturing system 1502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 15 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 15, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A graphics processing system configured to use a rendering space which is subdivided into a plurality of tiles, the graphics processing system comprising:
    geometry processing logic comprising:
        geometry transform and sub-primitive logic configured to receive graphics data of input graphics data items, and to determine transformed positions within the rendering space of one or more sub-primitives derived from the input graphics data items using a plurality of shader stages; and
        a tiling unit configured to generate control stream data including indications to indicate shader stage output data which is to be used for rendering each tile; and
    wherein the geometry processing logic is configured to write to a memory, for each instance of a pre-determined shader stage, shader stage output data comprising data output from the instance of the pre-determined shader stage used to process the received graphics data, wherein the pre-determined shader stage is a shader stage other than a final shader stage used by the geometry transform and sub-primitive logic; and
    rasterisation logic configured to generate a rendering output for each of the tiles, the rasterisation logic comprising:
        a fetch unit configured to fetch the shader stage output data for the pre-determined shader stage for a particular tile;
        rasterisation transform and sub-primitive derivation logic configured to derive, from the fetched shader stage output data and by re-executing one or more of said plurality of shader stages, transformed sub-primitives within the rendering space to be used for rendering the particular tile;
        one or more processing units for rendering the derived sub-primitives, to thereby generate a rendering output for the particular tile; and
        a cache configured to store a hierarchy of shader stage output data with different levels of the hierarchy representing output data from different re-executed stages of the plurality of shader stages for use in generating the rendering outputs for the tiles.

2. The graphics processing system of claim 1, wherein the cache comprises a plurality of memory pools, wherein different ones of the memory pools are configured to store shader stage output data from different levels of the hierarchy.

3. The graphics processing system of claim 1, wherein the cache is configured to store shader stage output data for one or more levels of the hierarchy below the level of the pre-determined shader stage output data, but wherein the cache is configured to not store shader stage output data for any level of the hierarchy above the level of the pre-determined shader stage output data.

4. The graphics processing system of claim 1, wherein the rasterisation logic is configured to retrieve shader stage output data from the hierarchy stored in the cache in a bottom-up manner.

5. The graphics processing system of claim 1, wherein the rasterisation logic comprises a cache controller configured to:
    maintain a reference count for each of a plurality of sets of one or more items of shader stage output data, wherein a reference count for a respective set of one or more items of shader stage output data indicates the number of sub-primitives currently being processed which are descendants of an item of shader stage output data of the respective set of one or more items of shader stage output data;
    increment the reference counts for all the items of shader stage output data required to generate a sub-primitive when the sub-primitive is sent for processing; and
    decrement the reference counts for all the items of shader stage output data required to generate a sub-primitive after the sub-primitive has been processed.

6. The graphics processing system of claim 5, wherein the cache controller is further configured to use the reference count for a set of one or more items of shader stage output data to determine whether an item of shader stage output data of the set can be safely evicted from the cache.

7. The graphics processing system of claim 1, wherein the rasterisation logic comprises a cache controller configured to:
    maintain a lock mask for each of a plurality of sets of one or more items of shader stage output data, wherein a lock mask for a respective set of one or more items of shader stage output data includes a lock bit for each tile of a rendering space in which the items of shader stage output data are being processed;
    set the lock bit for a tile within the lock mask for a respective set of one or more items of shader stage output data when one of the items of shader stage output data of the respective set is sent for processing; and
    clear the lock bit for a tile within the lock mask for a respective set of one or more items of shader stage output data when all of the items of shader stage output data of the respective set have been processed.

8. The graphics processing system of claim 7, wherein the cache controller is further configured to use the lock bits of the lock mask for a set of one or more items of shader stage output data to determine whether an item of shader stage output data of the set can be safely evicted from the cache.

9. The graphics processing system of claim 1, wherein the geometry processing logic is further configured to generate priorities for items of shader stage output data of the hierarchy based on the number of tiles that the items of shader stage output data overlap,
and wherein the rasterisation logic comprises a cache controller which is configured to evict items of shader stage output data from the cache based on their priorities.

10. The graphics processing system of claim 1, wherein some of the graphics data items are control points describing a patch to be tessellated to generate a plurality of tessellated primitives, and wherein the shader stages comprise one or more of: (i) vertex shading, (ii) hull shading, (iii) domain shading, (iv) tessellation, (v) geometry shading, and (vi) and clipping.

11. The graphics processing system of claim 1, wherein the control stream data includes sub-primitive indications to indicate which of the sub-primitives are to be used for rendering each tile, wherein the sub-primitive indications in the control stream data for a tile indicate how to derive the sub-primitives to be used for rendering the tile from the shader stage output data, and wherein the rasterisation transform and sub-primitive derivation logic is configured to derive the sub-primitives in accordance with the sub-primitive indications in the control stream data.

12. The graphics processing system of claim 11, wherein one or more of the sub-primitive indications is a hierarchical index, wherein a hierarchical index for a particular sub-primitive indicates one or more graphics data items at different levels of a hierarchy for use in deriving the particular sub-primitive.

13. The graphics processing system of claim 12, wherein the rasterisation transform and sub-primitive derivation logic is configured to use the hierarchical index for the particular sub-primitive to identify the one or more graphics data items of the hierarchy for use in deriving the particular sub-primitive.

14. The graphics processing system of claim 1, wherein a sub-primitive is to be used for rendering a tile if the sub-primitive is at least partially in the tile.

15. The graphics processing system of claim 1, wherein the input graphics data items describe geometry within a 3D scene to be rendered, and wherein the rendering output is a rendered image of the scene.

16. The graphics processing system of claim 1, wherein the shader stage output data written to memory comprises vertex data output from the pre-determined shader stage and additional data from a further pre-determined shader stage that is subsequent to the pre-determined shader stage.

17. The graphics processing system of claim 1, wherein the cache is configured to store derived sub-primitives and wherein the rasterisation logic further comprises:
a cache controller configured to:
receive the control stream data for a tile;
retrieve sub-primitives which are stored in the cache and which are indicated by the control stream data for the tile; and
provide the retrieved sub-primitives to the one or more processing units to be rendered.

18. The graphics processing system of claim 1, wherein the one or more processing units comprises:
a hidden surface removal unit configured to remove primitive fragments which are hidden; and
a texturing/shading unit configured to apply one or both of texturing and shading to primitive fragments.

19. A graphics processing method for a graphics processing system configured to use a rendering space which is subdivided into a plurality of tiles, the graphics processing method comprising a geometry processing phase and a rasterisation phase,
wherein the geometry processing phase comprises:
receiving, using geometry transform and sub-primitive logic of geometry processing logic, graphics data of input graphics data items, and determining transformed positions within the rendering space of one or more sub-primitives derived from the input graphics data items using a plurality of shader stages; and
generating, using a tiling unit of the geometry processing logic, control stream data including indications to indicate shader stage output data which is to be used for rendering each tile; and
wherein the geometry processing logic is configured to write to a memory, for each instance of a pre-determined shader stage, shader stage output data comprising data output from the instance of the pre-determined shader stage used to process the received graphics data, wherein the pre-determined shader stage is a shader stage other than a final shader stage used by the geometry transform and sub-primitive logic;
wherein the rasterisation phase comprises:
generating, using rasterisation logic, a rendering output for each of the tiles, the generating comprising:
fetching, using a fetch unit, shader stage output data for the pre-determined shader stage for a particular tile;
deriving, using rasterisation transform and sub-primitive derivation logic, from the fetched shader stage output data and by re-executing one or more of said plurality of shader stages, transformed sub-primitives within the rendering space to be used for rendering the particular tile;
rendering, using one or more processing units, the derived sub-primitives, to thereby generate a rendering output for the particular tile; and
storing, in a cache, a hierarchy of shader stage output data with different levels of the hierarchy representing output data from different re-executed stages of the plurality of shader stages for use in generating the rendering outputs for the tiles.

20. A non-transitory computer readable storage medium having stored thereon a computer readable description of an integrated circuit that, when processed in an integrated circuit manufacturing system, causes the integrated circuit manufacturing system to manufacture a graphics processing system which is configured to use a rendering space which is subdivided into a plurality of tiles, the graphics processing system comprising:
geometry processing logic comprising:
geometry transform and sub-primitive logic configured to receive graphics data of input graphics data items, and to determine transformed positions within the rendering space of one or more sub-primitives derived from the input graphics data items using a plurality of shader stages; and
a tiling unit configured to generate control stream data including indications to indicate shader stage output data which is to be used for rendering each tile; and
wherein the geometry processing logic is configured to write to a memory, for each instance of a pre-determined shader stage, shader stage output data comprising data output from the instance of the pre-determined shader stage used to process the received graphics data, wherein the pre-determined shader stage is a shader stage other than a final shader stage used by the geometry transform and sub-primitive logic; and rasterisation logic configured to generate a rendering output for each of the tiles, the rasterisation logic comprising:

a fetch unit configured to fetch the shader stage output data for the pre-determined shader stage for a particular tile;

rasterisation transform and sub-primitive derivation logic configured to derive, from the fetched shader stage output data and by re-executing one or more of said plurality of shader stages, transformed sub-primitives within the rendering space to be used for rendering the particular tile;

one or more processing units for rendering the derived sub-primitives, to thereby generate a rendering output for the particular tile; and a cache configured to store a hierarchy of shader stage output data with different levels of the hierarchy representing output data from different re-executed stages of the plurality of shader stages for use in generating the rendering outputs for the tiles.

* * * * *